US007436936B2

(12) United States Patent
Terpstra et al.

(10) Patent No.: US 7,436,936 B2
(45) Date of Patent: Oct. 14, 2008

(54) VOIP CALL THROUGH TESTER

(75) Inventors: Richard D. Terpstra, Superior, CO (US); Thomas S. Traylor, Broomfield, CO (US); Gregory Keith Brown, Thornton, CO (US); John Thomas Ward, Erie, CO (US); Andrew B. Lundgren, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 414 days.

(21) Appl. No.: 11/064,415

(22) Filed: Feb. 22, 2005

(65) Prior Publication Data

US 2006/0188080 A1 Aug. 24, 2006

(51) Int. Cl.
*H04M 1/24* (2006.01)
(52) U.S. Cl. ............... 379/27.01; 370/352; 370/401; 370/467
(58) Field of Classification Search ........... 379/27.01; 370/352, 401, 467
See application file for complete search history.

(56) References Cited

U.S. PATENT DOCUMENTS

| 5,940,480 | A | 8/1999 | Jeon et al. |
| 5,999,604 | A | 12/1999 | Walter |
| 6,421,726 | B1 | 7/2002 | Kenner et al. |
| 6,496,856 | B1 | 12/2002 | Kenner et al. |
| 6,502,125 | B1 | 12/2002 | Kenner et al. |
| 6,553,515 | B1 | 4/2003 | Gross et al. |
| 6,625,643 | B1 | 9/2003 | Colby et al. |
| 6,625,764 | B1 * | 9/2003 | Dawson ............ 714/715 |
| 6,665,293 | B2 * | 12/2003 | Thornton et al. ....... 370/352 |
| 6,665,706 | B2 | 12/2003 | Kenner et al. |
| 6,665,726 | B1 | 12/2003 | Leighton et al. |
| 6,718,328 | B1 | 4/2004 | Norris |
| 6,745,242 | B1 | 6/2004 | Schick et al. |
| 6,751,673 | B2 | 6/2004 | Shaw |
| 6,763,388 | B1 | 7/2004 | Tsimelzon |
| 6,781,959 | B1 | 8/2004 | Garakani et al. |
| 6,785,374 | B2 | 8/2004 | Wang et al. |
| 6,795,400 | B1 | 9/2004 | Schick |
| 6,799,221 | B1 | 9/2004 | Kenner et al. |
| 6,937,594 | B2 * | 8/2005 | Smith et al. ............ 370/352 |
| 2002/0136224 | A1 | 9/2002 | Motley |

(Continued)

OTHER PUBLICATIONS

Agilent Technologies, Products & Services, www.agilent.com, 2000-2005, 68 pages.

(Continued)

*Primary Examiner*—Quynh H Nguyen
(74) *Attorney, Agent, or Firm*—Hensley Kim & Holzer, LLC

(57) ABSTRACT

According to various embodiments of the present invention, systems and methods for verifying the routing of a call through a network, including: generating an outbound call from a test tool in a first network, the outbound call including a test key and a destination number, the destination number being associated with a communication device accessible to first network, routing the outbound call to second network, receiving outbound call from second network in the form of inbound call to first network, the inbound call including the test key and the destination number, accessing the test key, and based at least in part on the test key, routing the inbound call to the test tool. In some instances, call tracking information may be collected, analyzed, and/or displayed.

30 Claims, 15 Drawing Sheets

U.S. PATENT DOCUMENTS

| | | |
|---|---|---|
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0163882 A1 | 11/2002 | Bornstein et al. |
| 2003/0128692 A1 | 7/2003 | Mitsumori et al. |
| 2003/0214963 A1 | 11/2003 | Moody et al. |

OTHER PUBLICATIONS

Empirix, Products & Services, www.empirix.com, 2005, 12 pages.

Nettest, Wireless Service Quality Monitoring, www.nettest.com, 2005, 34 pages.

Radcom, Network Test Solutions, www.radcom.com, date unknown, 82 pages.

ISA/US, *International Search Report*, International application No. PCT/US06/06599, Commissioner for Patents, P.O. Box 1450, Alexandria Virginia 22313-1450; Date of mailing:Sep. 6, 2007, 3 pages.

\* cited by examiner

VOIP CALL THROUGH TESTER

CROSS REFERENCE TO RELATED APPLICATIONS

The present application is related to U.S. patent application Ser. No. 11/064391 entitled "Voice Call Coordinator," filed on a date even herewith and assigned to an entity common hereto, the contents of which are herein incorporated by reference in their entirety for all purposes.

BACKGROUND OF THE INVENTION

One or more embodiments of the present invention are related to systems and methods for placing media communications through a network, and more particularly to systems and methods for verifying the routing of a call through a network.

Providers of voice over internet protocol ("VoIP") networks currently obtain blocks of phone numbers for devices associated with their VoIP network from providers of public switched telephone networks ("PSTN"). Providers of VoIP networks must often settle for the PSTN provider's assurance that the phone numbers have been properly provisioned, and that the PSTN is configured correctly to route calls for those numbers to VoIP network. Providers of a VoIP network often have no efficient means to verify that calls to the block of phone numbers are properly routed to the VoIP network. Phone calls placed manually to check provisioning may result in toll charges for completed calls and/or an annoying ringing on the telephone number owner's telephone.

Additionally, providers of VoIP networks have an interest in verifying that calls into, through, and out of a VoIP network are routed correctly by the VoIP network. Currently, VoIP providers must often manually reconstruct each call by "mining" log files of network devices and hand-drawing the call flows. Such an approach is often time-consuming, and expensive, sometimes requiring hours or days to reconstruct a call flow.

Hence, for at least these reasons, there exists a need in the art for advanced systems and methods for system verification.

BRIEF SUMMARY OF THE INVENTION

One or more embodiments of the present invention are related to systems and methods for placing media communications through a network, and more particularly to systems and methods for verifying the routing of a call through a network.

Some embodiments of the present invention provide methods for verifying the routing of a call through a network. Such methods include generating an outbound call from a test tool in a first network. The outbound call includes a test key and a destination number, and the destination number is associated with a communication device accessible to the first network. The methods further include routing the outbound call to a second network and receiving the outbound call from the second network in the form of an inbound call to the first network. The inbound call includes the test key and the destination number, and the methods further include accessing the test key and based at least in part on the test key, routing the inbound call to the test tool. In one particular case, the first network is a voice over internet protocol network, and the second network is a public switched telephone network. In some cases, the test key is included with the outbound call in the place of an origination number.

In some instances, the methods further include receiving the inbound call at a network resource within the first network. The network resource within the first network is operable to access the test key and to route the inbound call to the test tool. In other instances, the methods further include receiving the inbound call at a first network resource within the first network, routing the inbound call to a second network resource within the first network, accessing the test key with the second network resource, and routing the inbound call to the test tool based on the test key. The network routing resource can be, but is not limited to, a session border controller, a gateway, a gateway controller, a softswitch, a proxy server, or a feature server. In some instances, the network resource is a softswitch configured to route all outbound calls to the public switched telephone network. As one possible alternative, the network resource is a softswitch configured to route only outbound calls containing the test key to the public switched telephone network.

In accordance with various other instances of the embodiments, the methods further include collecting tracking information for the inbound call and the outbound call. The tracking information can be, but is not limited to, signaling system 7 tracking information, internet protocol device control tracking information, and/or session initiation protocol tracking information. In some cases, the session initiation protocol tracking information includes signaling latency information. In such cases, the methods may further include calculating post-dialing delay.

In some instances of the embodiments, the methods further include providing a graphical output device, creating a sequence diagram showing the tracking information, and displaying the sequence diagram on the graphical output device. The graphical output device may be communicably coupled to a voice call coordinator. The test tool can be, but is not limited to, a computer terminal communicably coupled to the first network, and wherein the first network is a Voice over Internet Protocol network. Alternatively, the test tool can be, but is not limited to, a computer terminal communicably coupled to the second network, wherein the first network is a Voice over Internet Protocol network, and wherein the second network is a public switched telephone network.

Other embodiments of the present invention provide methods for verifying whether a call has been properly provisioned in a voice over internet protocol network. Such methods include generating an outbound call from a test tool in a voice over internet protocol network. The outbound call includes a destination number, and the methods further include routing the outbound call to a public switched telephone network, determining whether the outbound call has been placed to the destination number without coming back into the voice over internet protocol network, and terminating the outbound call based on a determination that the outbound call has been placed to the destination number without coming back into the voice over internet protocol network. In some cases, the methods further include making a record that indicates that the destination party phone number has not been properly provisioned. In some instances of the embodiments, determining whether the outbound call has been placed to the destination party phone number without coming back into the VoIP network includes determining whether the outbound call rings at the destination party phone number. In other instances of the embodiments, the methods further include collecting call tracking information for the outbound call from at least one device that handled the outbound call and displaying the call tracking information for the outbound call.

Yet other embodiments of the present invention provide systems for verifying the routing of a voice-over-internetprotocol call through a voice over internet protocol network. Such systems include a test tool within a voice over internet protocol network configured to generate an outbound call with a predetermined originating number. Further, the systems include a network routing resource configured to receive the outbound call, send the outbound call to a public switched telephone network, receive the outbound call back from the public switched telephone network in the form of an inbound call, and route the inbound call through the voice over internet protocol network. Another network routing resource is provided and configured to receive the inbound call, recognize that the inbound call is a test call based on the predetermined originating number, and route the test call back to the test tool. The network routing resources can be, but are not limited to, session border controllers, softswitches, gateways, gateway controllers, proxy servers, or feature servers.

In some instances of the embodiments, a voice call coordinator is further configured to collect tracking information for the test call. The tracking information includes, but is not limited to, signaling system 7 tracking information, internet protocol device control tracking information, and/or session initiation protocol tracking information. The voice call coordinator may be further configured to calculate post-dialing delay. In some cases, the voice call coordinator includes a graphical output device, and the voice call coordinator is configured to provide a sequence diagram showing the tracking information and to display the sequence diagram on the graphical output device.

Various other embodiments of the present invention provide systems for verifying network provisioning. Such systems include a computer communicably coupled to a computer readable medium and a first network. The computer readable medium includes instructions executable by a microprocessor to generate an outbound call having a test key and a destination number. The destination number is associated with a communication device accessible to the first network. The computer readable medium further includes instructions executable by a microprocessor to provide the outbound call to a routing resource associated with the first network, the routing resource being operable to direct the outbound call to a second network and to receive the outbound call back from the second network, the routing resource being further operable to access the test key, receive the outbound call from the routing resource, and provide tracking information for the test call. In some cases, the instructions executable to provide tracking information for the call include instructions executable to provide information. Such information includes, but is not limited to, signaling system 7 tracking information, internet protocol device control tracking information, session initiation protocol tracking information, signaling latency information, and/or post-dialing delay. In various other instances, the instructions are further executable to create a sequence diagram showing the tracking information, for display by a graphical output device.

Yet other embodiments of the present invention provide systems for verifying provisioned access numbers in a voice over internet protocol network. Such systems include a softswitch associated with a first network and communicably coupled to a test tool. The softswitch is operable to receive a test call from the test tool, the test call including a test key and a destination number. The destination number is associated with a communication device accessible to a first network, and the softswitch is further operable to direct the test call to a second network, receive the test call back from the second network, access the test key, and based at least in part on the test key, route the test call to the test tool. In some cases, the first network is a voice over internet protocol network and the second network is a public switched telephone network.

This summary provides only a general outline of some embodiments of the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

One or more embodiments of the present invention are related to systems and methods for placing voice calls through a network, and more particularly to systems and methods for verifying the routing of a call through a network.

Some embodiments of the present invention provide systems and methods for verifying routing and/or provisioning of numbers in a network. The systems and methods can be implemented using computers and computer software. Such computer software can be maintained on a computer readable medium. As used herein, the term "computer readable medium" is used in its broadest sense to mean any storage device accessible to a computer. Thus, for example, a computer readable medium can be a hard disk drive, a RAM, a floppy diskette, a CD ROM, an EEPROM, a magnetic tape, and/or the like. In some cases, the computers and/or computer software can communicate via a network. In particular, the computers can be communicably coupled to a network and/or each other. As used herein, the term "network" is used in its broadest sense to mean any system capable of passing communications from one entity to another. Thus, for example, a network can be, but is not limited to, the Internet, a virtual private network, a local area network, a wide area network, a WiFi network, a PSTN, a cellular network, and/or any combination thereof. Further, the term "communicably coupled" is used herein in its broadest sense to mean any coupling whereby information may be passed. Thus, for example, communicably coupled includes electrically coupled by, for example, a wire; optically coupled by, for example, an optical cable; and/or wirelessly coupled by, for example, a radio frequency or other transmission media.

In some cases, the aforementioned systems and methods employ routing to handle calls and/or data. As used herein, the term "routing" is used in its broadest sense to mean any action taken to transfer, initiate, terminate, end, and/or direct calls and/or data. In various instances, calls are handled by network routing resources. As used herein, the terms "network resource," "network element," or "network routing resource" are used in their broadest senses to mean any device and/or software capable of routing a call and/or data, including, but not limited to, a session border controller, a gateway, a gateway controller, a softswitch, a proxy server, or a feature server. According to some embodiments of the present invention, network devices such as network routing resources create tracking information. As used herein, the term "tracking information" is used in its broadest sense to mean any data that is associated with or describes how a network element handled a call. The term "tracking information" is used interchangeably herein with the term "signaling information."

Figure 1A:
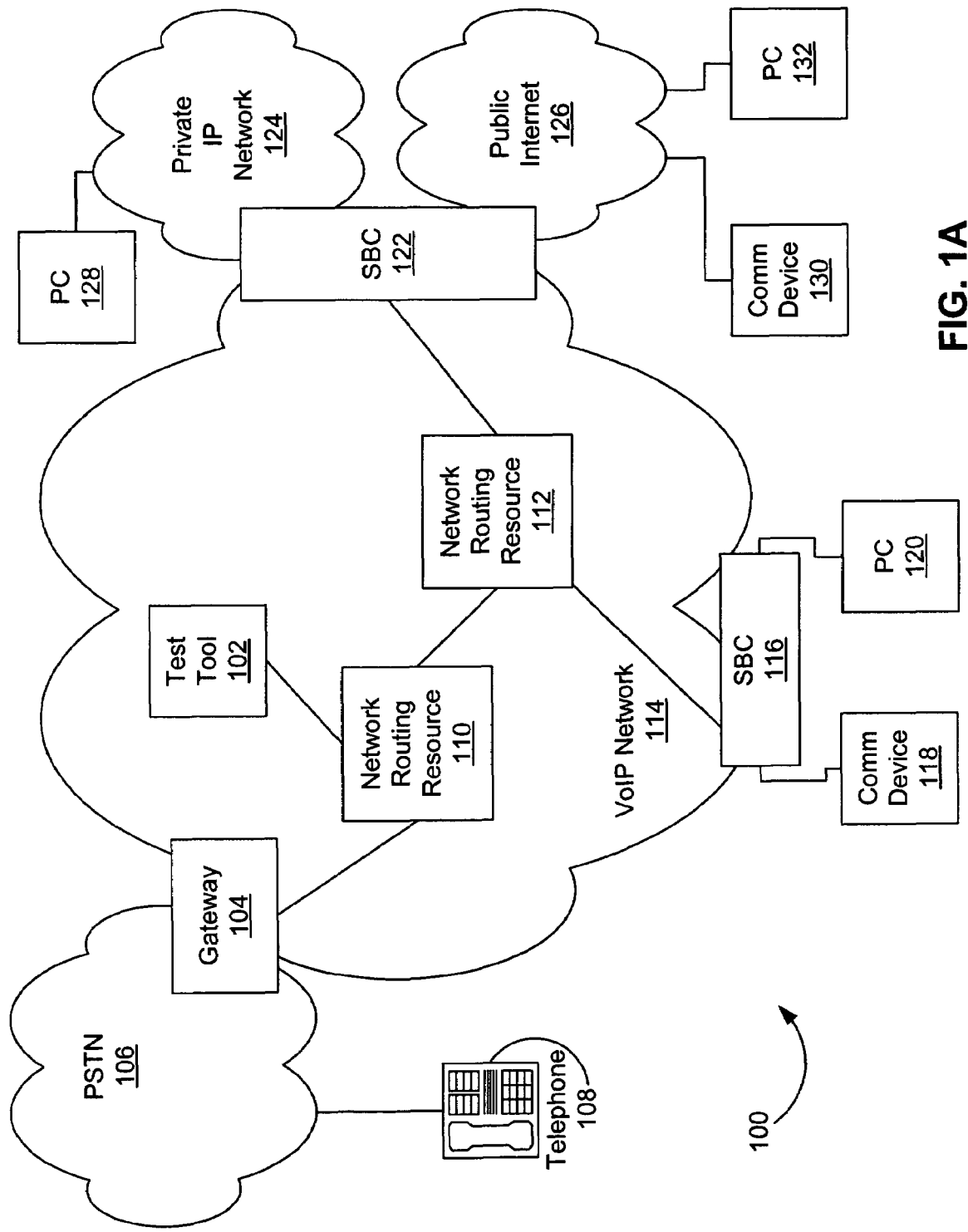
FIG. 1A depicts a system for verifying the routing of a call through a network in accordance with various embodiments of the present invention.

Turning to FIG. 1A, a call routing verification system 100 in accordance with various embodiments of the present invention is illustrated. Call routing verification system 100 includes a test tool 102, network routing resources 110, 112, a gateway 104, session border controllers ("SBC") 116, 122, a public switched telephone network ("PSTN") 106, a Voice over Internet Protocol ("VoIP") network 114, a private Internet Protocol ("IP") network 124, a public internet 126, a telephone 108, communication devices 118, 130, and personal computers ("PC") 120, 128, 132. Test tool 102 and network routing resources 110, 112 are communicably coupled to one another and associated with VoIP network 114.

Gateway 104 resides at the edge of VoIP network 114, communicably couples PSTN 106 and VoIP network 114, and is operable to send and/or receive communications between PSTN 106 and VoIP network 114. Gateway 104 is communicably coupled to network routing resource 110. In some embodiments of the present invention, gateway 104 is a computer operating a software module, and the software module is operable to facilitate communication between VoIP network 114 and PSTN 106. Based on the disclosure provided herein, one of ordinary skill in the art will appreciate a variety of devices that can be used to serve the purposes of gateway 104.

Network routing resources 110, 112 are operable to receive calls and relay them to a specific destination based on information contained within the calls and/or instructions from test tool 102. The specific destination includes, but is not limited to, another network routing resource 112, SBCs 116, 122, test tool 102, and/or gateway 104. In some embodiments of the present invention, network routing resources 110, 112 are computers operating software modules, and the software modules are capable of receiving and/or routing calls. Network routing resource 110 or 112 can be, but is not limited to, an SBC, a gateway, a gateway controller, a softswitch, a proxy server, or a feature server. In some instances, network routing resource 110 is a softswitch and network routing resource 112 is a feature server. Based on the disclosure provided herein, one of ordinary skill in the art will appreciate a variety of devices that can be used to serve the purposes of network routing resources 110, 112.

Telephone 108, communication devices 118, 130, and PCs 120, 128, 132 are operable, among other things, to transmit/receive voice and/or data transmissions to/from a user of such devices. Telephone 108 is operable to initiate calls through PSTN 106 as well as receive calls via PSTN 106, to receive and transmit a user's voice communications to PSTN 106, and to receive and reproduce another user's voice communications from PSTN 106. Communication device 118 and PC 128 are operable to initiate calls through data networks such as VoIP network 114, as well as receive calls via networks such as VoIP network 114, to receive and transmit a user's voice and/or data communications to VoIP network 114, and to receive and reproduce another user's voice and/or data communications from VoIP network 114. Communication device 130 and PC 132 are operable to initiate calls through data networks such as public internet 126 as well as receive calls via networks such as public internet 126, to receive and transmit a user's voice and/or data communications to public internet 126, and to receive and reproduce another user's voice and/or data communications from public internet 126. PC 128 is operable to initiate calls through data networks such as private IP network 124 as well as receive calls via networks such as private IP network 124, to receive and transmit a user's voice and/or data communications to private IP network 124, and to receive and reproduce another user's voice and/or data communications from private IP network 124. Communication devices 118, 130 include, but are not limited to, PCs, telephones, SIP phones, videophones, or other web-enabled data receipt/transfer devices.

SBCs 116, 122 reside at the edge of VoIP network 114. SBC 116 communicably couples VoIP network 114 with communication device 118 and/or PC 120. SBC 122 communicably couples VoIP network 114, private IP network 124, and public internet 126. SBC 116 and SBC 122 are also communicably coupled to network routing resource 112. SBCs 116, 122 are operable to send and/or receive communications between VoIP network 114 and IP networks (such as private IP network 124 and/or public internet 126) and between VoIP network 114 and communication devices 118 and/or PCs 120. In some embodiments of the present invention, SBCs 116, 122 are computers operating one or more software modules, and the one or more software modules are operable to facilitate communication between VoIP network 114 and other IP networks. Based on the disclosure provided herein, one of ordinary skill in the art will appreciate a variety of devices that can be used to serve the purposes of SBCs 116, 122.

Test tool 102 resides within VoIP network 114. Test tool 102 is communicably coupled at least to network routing resource 110. According to some embodiments, test tool 102 is operable to initiate calls through network routing resource 110, and to receive calls via network routing resource 110. Test tool 102 is operable to create a SIP message corresponding to each call; for example, test tool 102 is operable to insert information into the origination party and/or the destination party field of a SIP message. According to some embodiments, test tool 102 comprises a software module executed by a computer, with test tool 102 outputs displayed on a computer monitor.

Figure 1B:
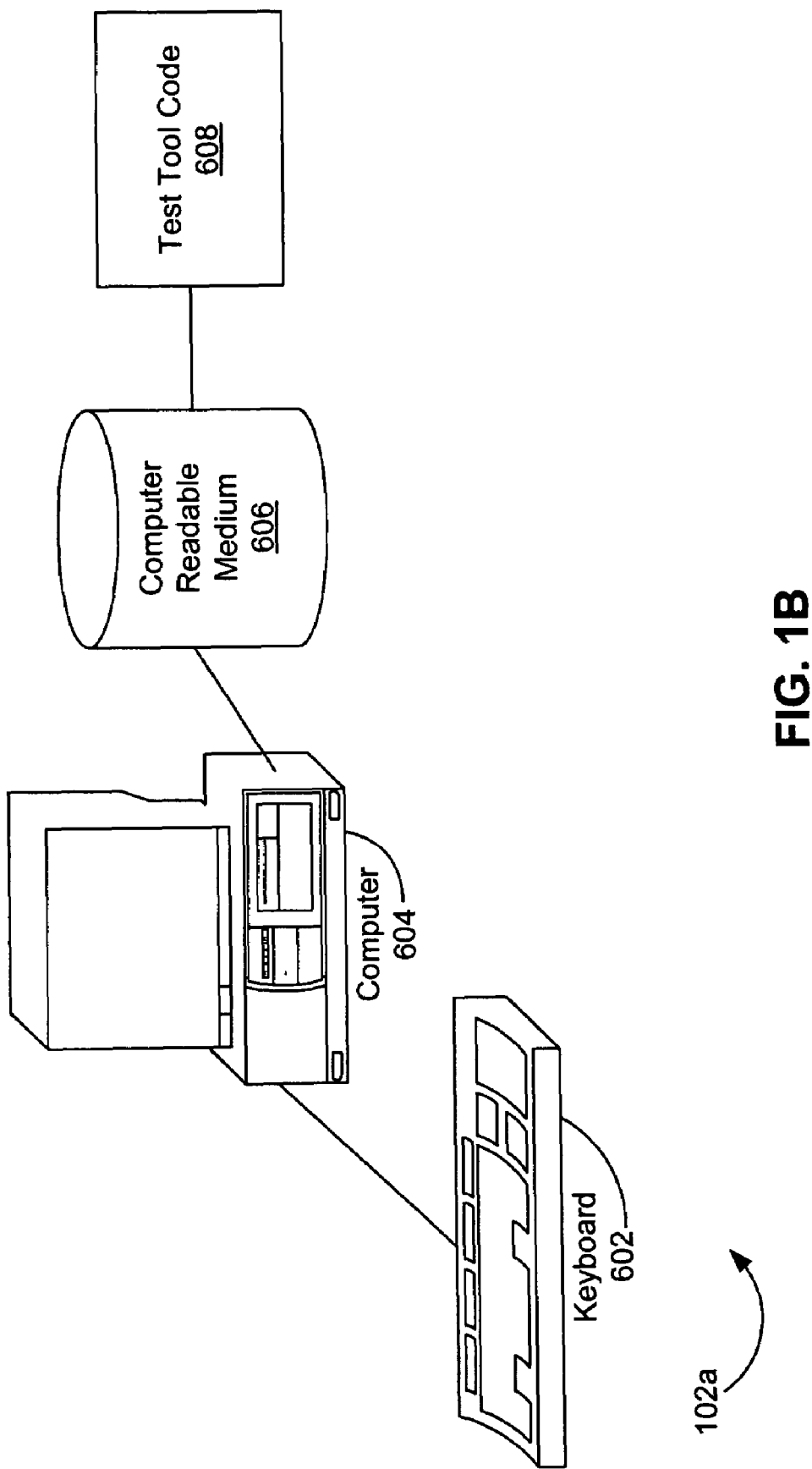
FIG. 1B depicts a test tool according to some embodiments of the present invention.

As illustrated in FIG. 1B, an exemplary test tool 102a according to some embodiments of the present invention is provided. A user interface device, such as a keyboard 602, is communicably coupled to a computer 604, to which it sends information. Computer 604 is communicably coupled to a computer readable medium 606. Computer readable medium 606 is communicably coupled to, and/or comprises, test tool code 608. Test tool code 608 provides instructions for performing methods of test tool 102a, such as initiating a VoIP call.

In a typical scenario, each communication device 118, 130, telephone 108, and/or PC 120, 128, 132, is associated with a particular phone number. When a call is made to a phone number associated with a data network, such as VoIP network 114, the call is routed through VoIP network 114 to the correct PC, telephone, and/or communication device. For example, when a call is placed using telephone 108 and indicating a phone number associated with VoIP network 114, the call passes from telephone 108 to PSTN 106. PSTN 106 recognizes the phone number as one of a block of phone numbers that should be directed to gateway 104 and/or VoIP network 114. PSTN 106 directs the call to gateway 104. Gateway 104 receives the call, and sends the call to network routing resource 110. Network routing resource 110 determines which network routing resource (in this case network routing resource 112) is configured to deliver the call to the particular phone number. Network routing resource 112 resides at the edge of the network, and is the last VoIP network 114 device responsible for delivering the call to the particular phone number. For example, network routing resource 112 may be a feature server associated with the particular phone number. Network routing resource 110 routes the call to network routing resource 112. Because communication device 130 is communicably coupled to public internet 126, network routing resource 112 next routes the call to SBC 122. SBC 122 receives the call, and then directs the call through public internet 126 to communication device 130.

Test tool 102 is operable to verify the routing of a call to PSTN 106 to determine whether PSTN 106 correctly routes calls to phone numbers associated with VoIP network 114, according to some embodiments of the present invention. If PSTN 106 is correctly configured to send calls for phone numbers associated with VoIP network 114 to gateway 104 and/or VoIP network 114, then calls for such phone numbers initiated within VoIP network and sent out to PSTN 106 through gateway 104 should return to VoIP network 114 as incoming calls. Some embodiments of test tool 102 use this principle in verifying the routing of such calls.

Test tool 102 begins by initiating a call, and the call comprises a Session Initiation Protocol ("SIP") message. The SIP message includes an origination number and a destination number, as well as a unique call identification. When initiating a test call, test tool 102 creates a test key. For example, test key may be created in the place of an origination number. The test key can be, but is not limited to, a series of numbers and/or letters, or a null value. Once the call has been initiated, test tool 102 sends the call to network routing resource 110.

Figure 1C:
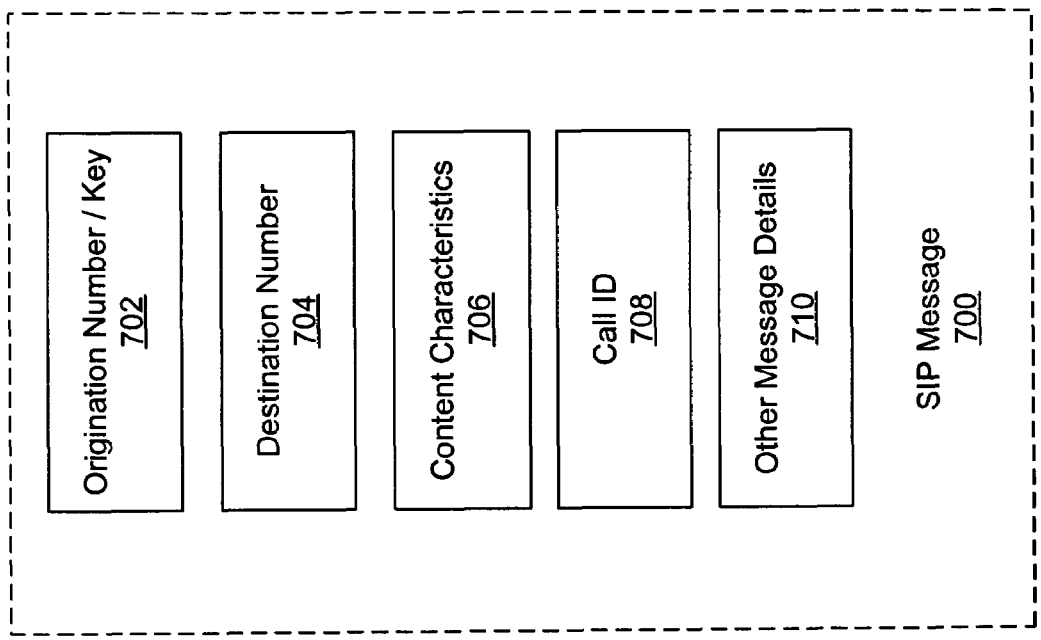
FIG. 1C depicts a SIP message according to one or more embodiments of the present invention.

Turning now to FIG. 1C, an exemplary Session Initiation Protocol ("SIP") message 700 according to various embodiments of the present invention is provided. SIP message 700 comprises an origination number or key field 702, a destination number field 704, a content characteristics field 706, a call identification field 708, and/or an other message details field 710. In a typical VoIP call, the origination number field 702 specifies the phone number of the phone initiating the call. As used by the test tool of some embodiments of the present invention, a key may be created in the origination number field 702 to be accessed by network routing resources and other network elements. Destination number field 704 typically specifies the phone number of the party to which the call is being placed. Network routing resources typically use the destination number field 704 to route the call to another network element closer to or associated with the destination number. Thus, calls placed with a destination number field 704 associated with a destination in a VoIP network are routed to the VoIP network. Content characteristics field 706 may indicate a content type and/or content length for the SIP message 700. For example, content type may be indicated as "application/sdp," or "session description protocol." Call identification field 708 includes a unique alphanumeric value that distinguishes the call from other calls, including other calls with the same origination number field 702 and destination number field 704. In some instances of the embodiments, the value of call identification field 708 may be assigned randomly and/or chosen from a list. Finally, the other message details field 710 may include information about the SIP message 700 such as a time when the message was created and/or handled, a maximum number of forwards permitted, and/or a time when the SIP message 700 expires.

Figure 1D:
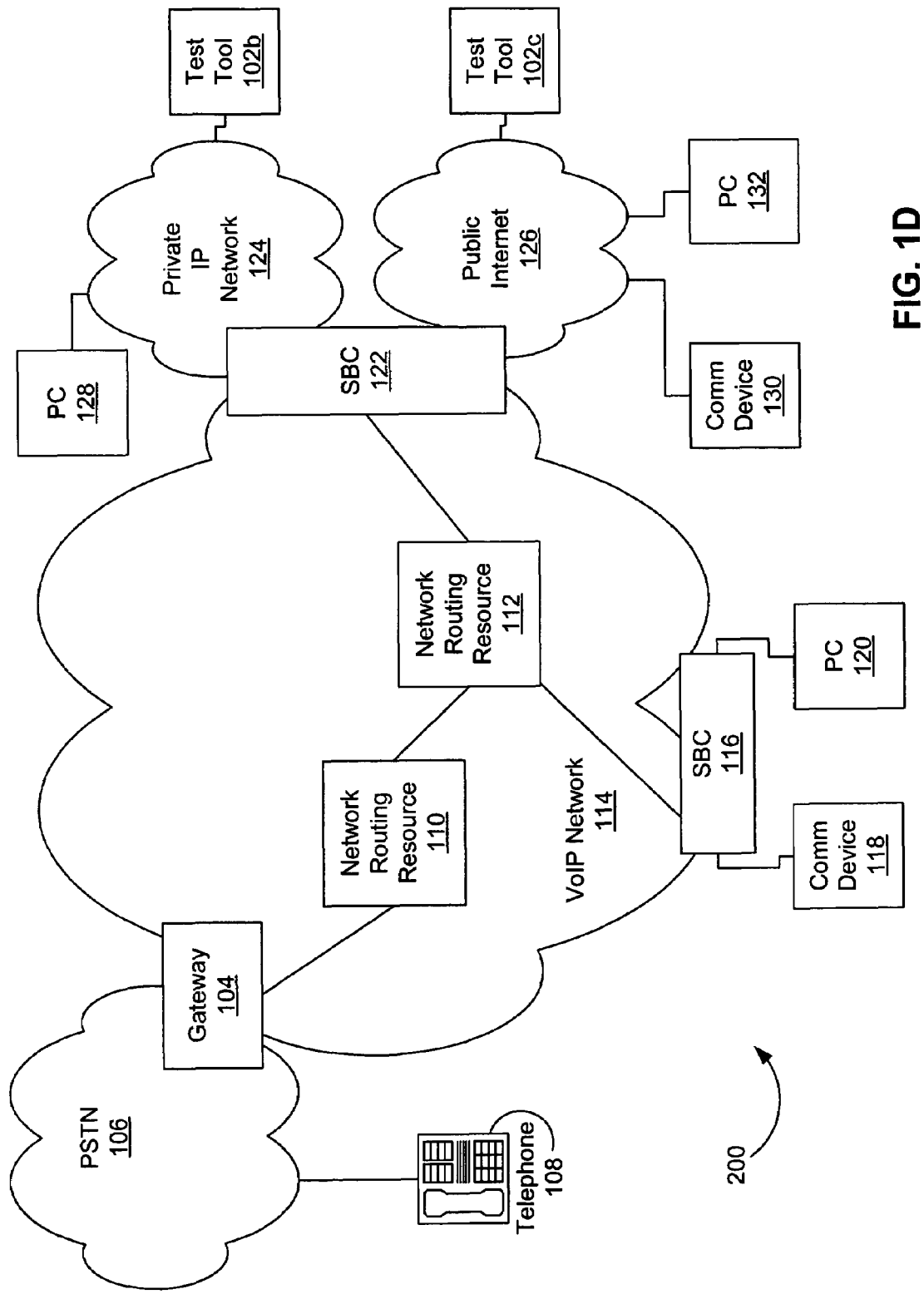
FIG. 1D depicts a system for verifying the routing of a call through a network in accordance with various embodiments of the present invention.

Turning now to FIG. 1D, a call routing verification system 200 in accordance with other embodiments of the present invention is illustrated. Call routing verification system 200 is similar in most respects to call routing verification system 100, except call routing verification system 200 comprises test tools 102b, 102c external to VoIP network 114. Test tool 102b is communicably coupled to private IP network 124, which is in turn communicably coupled to VoIP network 114 via SBC 122. Test tool 102c is communicably coupled to public internet 126, which is in turn communicably coupled to VoIP network 114 via SBC 122.

According to some embodiments, test tools 102b, 102c are operable to initiate calls to destination numbers associated with VoIP network 114, and to receive calls from VoIP network 114. Test tools 102b, 102c are operable to create a SIP message corresponding to each call; for example, test tools 102b, 102c are operable to insert information into the origination party and/or the destination party field of a SIP message. According to some embodiments, test tools 102b, 102c comprise software modules executed by computers, with test tool 102b, 102c outputs displayed on computer monitors.

Test tools 102b, 102c operate in much the same fashion as test tool 102. In a typical scenario, test tool 102b initiates a call with a test key created in the origination number field and a destination number associated with VoIP network 114. Test tool 102b sends the call through private IP network 124 to SBC 122. SBC 122 may then route the call to network routing resource 112. SBC 122, network routing resource 112, or another network device that handles the call is configured to access the test key and route the call back to test tool 102*b* based on the test key. According to some embodiments, SBC 122, network routing resource 112, or other network devices that handle the incoming call from test tool 102*b* are configured to access the test key, based on the test key and the destination number to determine if they are the last devices that will handle the call within VoIP network 114, and if so, to route the call back to test tool 102*b* instead of to the destination number. Once test tool 102*b* receives the re-routed call, test tool 102*b* ends the call. In some embodiments, once test tool 102*b* receives the re-routed call, test tool 102*b* sends the call to a voice call coordinator for collection and/or analysis of call tracking information for the call. If the call is placed to destination number without having been re-routed back to test tool 102*b*, test tool 102*b* ends the call. For example, if test tool 102*b* determines that a test call is ringing at the destination number, test tool 102*b* ends the call. In such cases, test tool 102*b* may make a record indicating that the particular test call and/or the particular destination number have not been routed correctly to, from, and/or through VoIP network 114.

Some embodiments of test tool 102 provide testing solutions that add to or improve upon existing solutions. For example, prior solutions involved manually spot checking a subset of phone numbers to see if provisioning had failed; such solutions required higher manual effort and did not test every telephone number. Some embodiments of the present invention use SIP messaging to set up a call to each phone number or to set up a call appearing to originate from each phone number. According to such embodiments, the network recognizes the call as a test call based on the "calling party number" field and intercepts the call prior to sending the call to the dialed/destination phone number, instead routing the call back to the test tool. As the test tool observes the call returning to itself, the test tool marks the call as successful and releases the call; otherwise, if the test tool receives a failure response or the call does not return to the test tool, the test tool marks the call as failed and releases the call. Such an approach may allow an operator to specify any number of telephone numbers to test, whereas prior solutions would have been too manually intensive. Such an approach may also eliminate any toll charges for the calls or test calls, because the test tool may release the call during the ringing phase. Alternatively, the test tool may ignore the ringing message. Finally, such an approach may prevent potential annoyance of the owner of the "called party number" or destination number, such as annoyances caused by calling and/or initiating the ringing phase at the destination number and then hanging up.

Figure 2A:
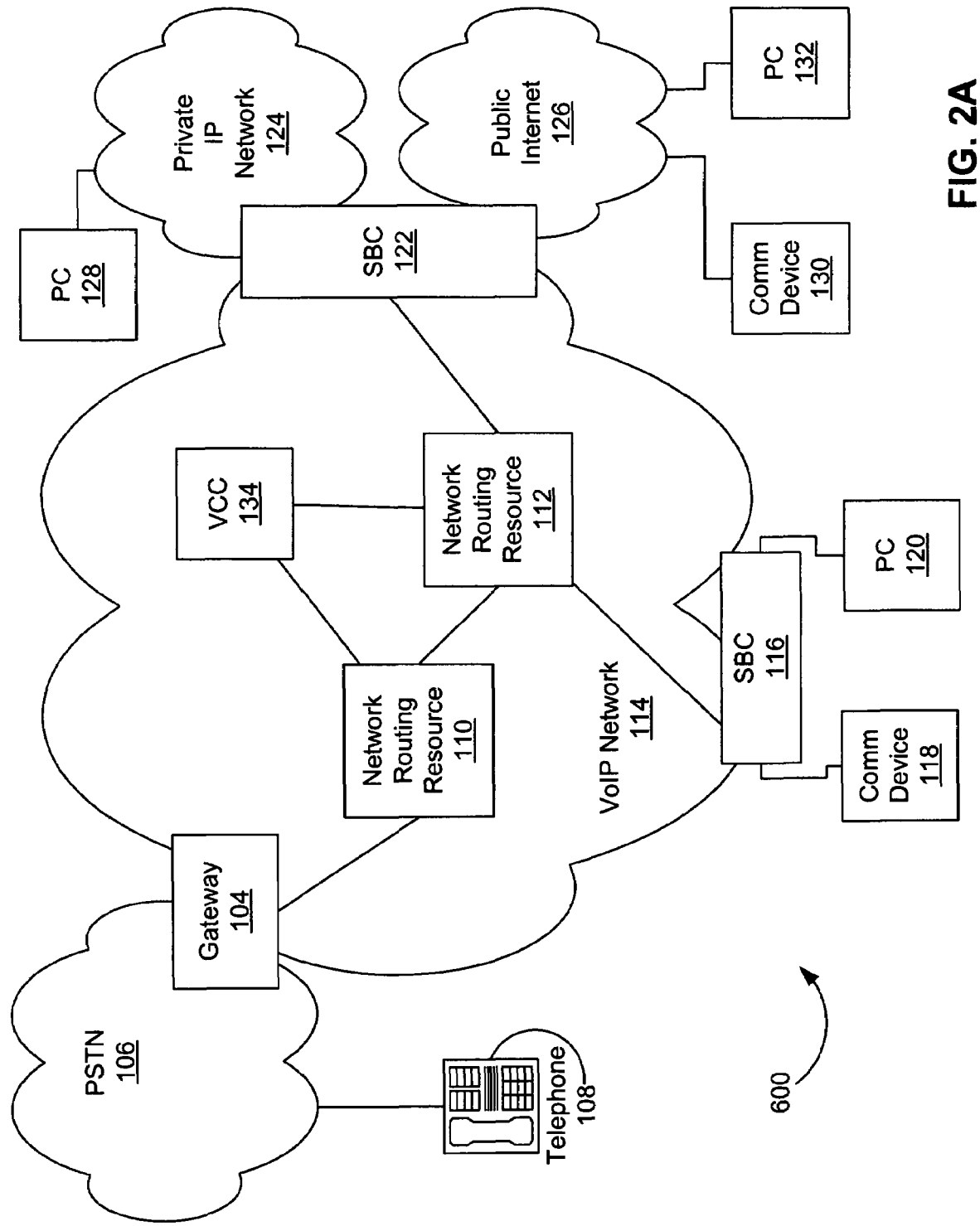
FIG. 2A depicts a system for collecting signaling information from a call through a network in accordance with various embodiments of the present invention.

Turning to FIG. 2A, a call signaling information collection and analysis system 600 in accordance with various embodiments of the present invention is illustrated. Call signaling information collection and analysis system 600 includes a voice call coordinator ("VCC") 134, network routing resources 110, 112, a gateway 104, SBCs 116, 122, PSTN 106, a VoIP network 114, a private IP network 124, a public internet 126, a telephone 108, communication devices 118, 130, and PCs 120, 128, 132. VCC 134 and network routing resources 110, 112 are communicably coupled to one another and associated with VoIP network 114.

VCC 134 is operable to collect signaling information for any call that passes through VoIP network 114, not just test calls initiated by test tool 102. VCC 134 may accomplish this by providing an interface device to allow a network operator to view a particular call and/or Call Detail Records for a particular call and/or select the particular call for expanded analysis. In analyzing the particular call, VCC 134 may retrieve signaling information from each network element that handled the call, such as network routing resource 110, and display the signaling information to the network operator. By analyzing and ordering signaling information and/or Call Detail Records, VCC 134 may display a sequence diagram that illustrates the signaling across all network elements that processed, routed, and/or handled the call.

Figure 2B:
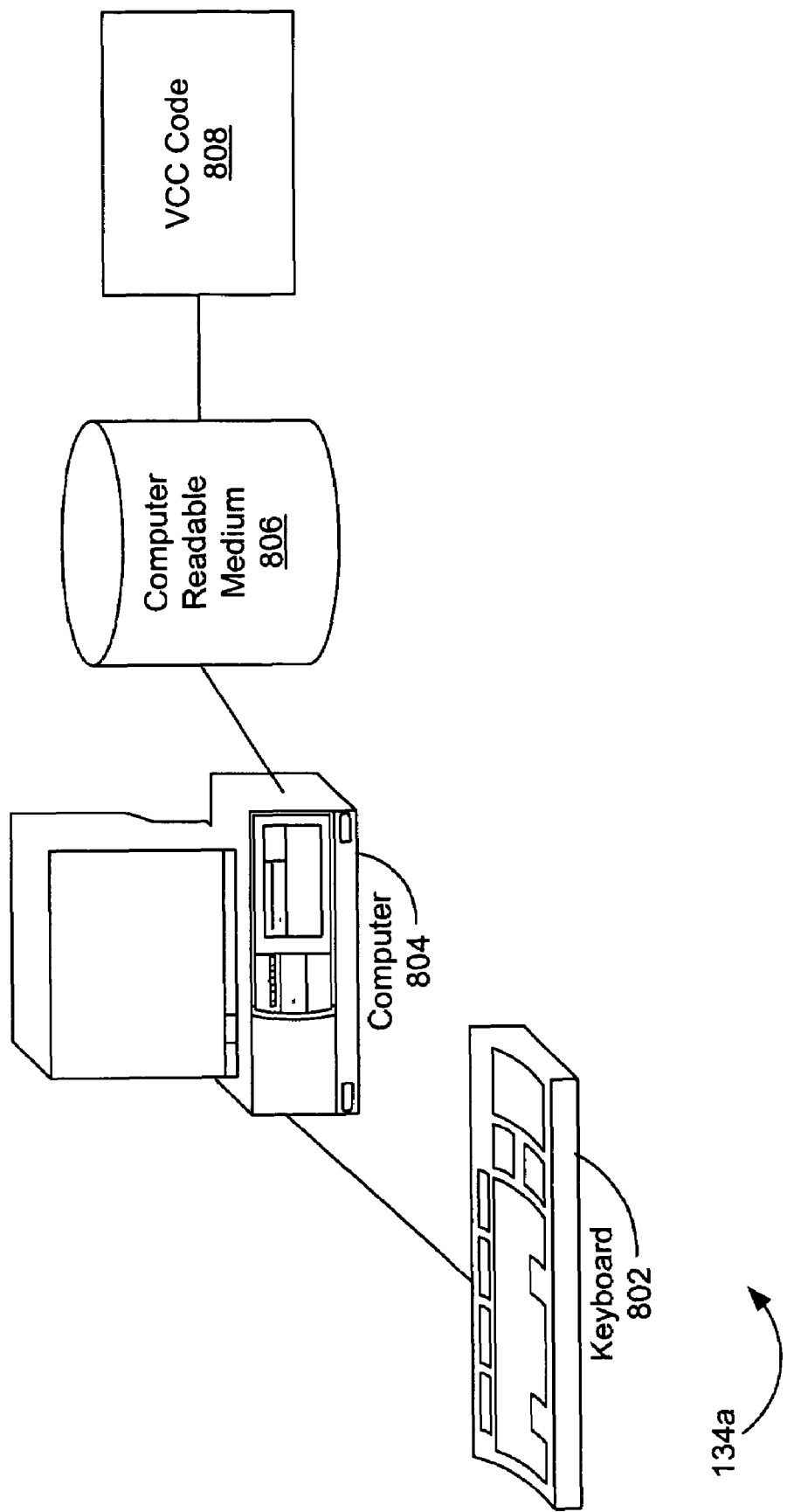
FIG. 2B depicts a voice call coordinator according to some embodiments of the present invention.

As illustrated in FIG. 2B, an exemplary voice call coordinator 134*a* according to some embodiments of the present invention is provided. A user interface device, such as a keyboard 802, is communicably coupled to a computer 604, to which it sends information. Computer 804 is communicably coupled to a computer readable medium 806. Computer readable medium 806 is communicably coupled to, and/or comprises, VCC code 808. VCC code 808 provides instructions for performing methods of VCC 134*a*, such as querying network devices for signaling information associated with a particular call.

Figure 2C:
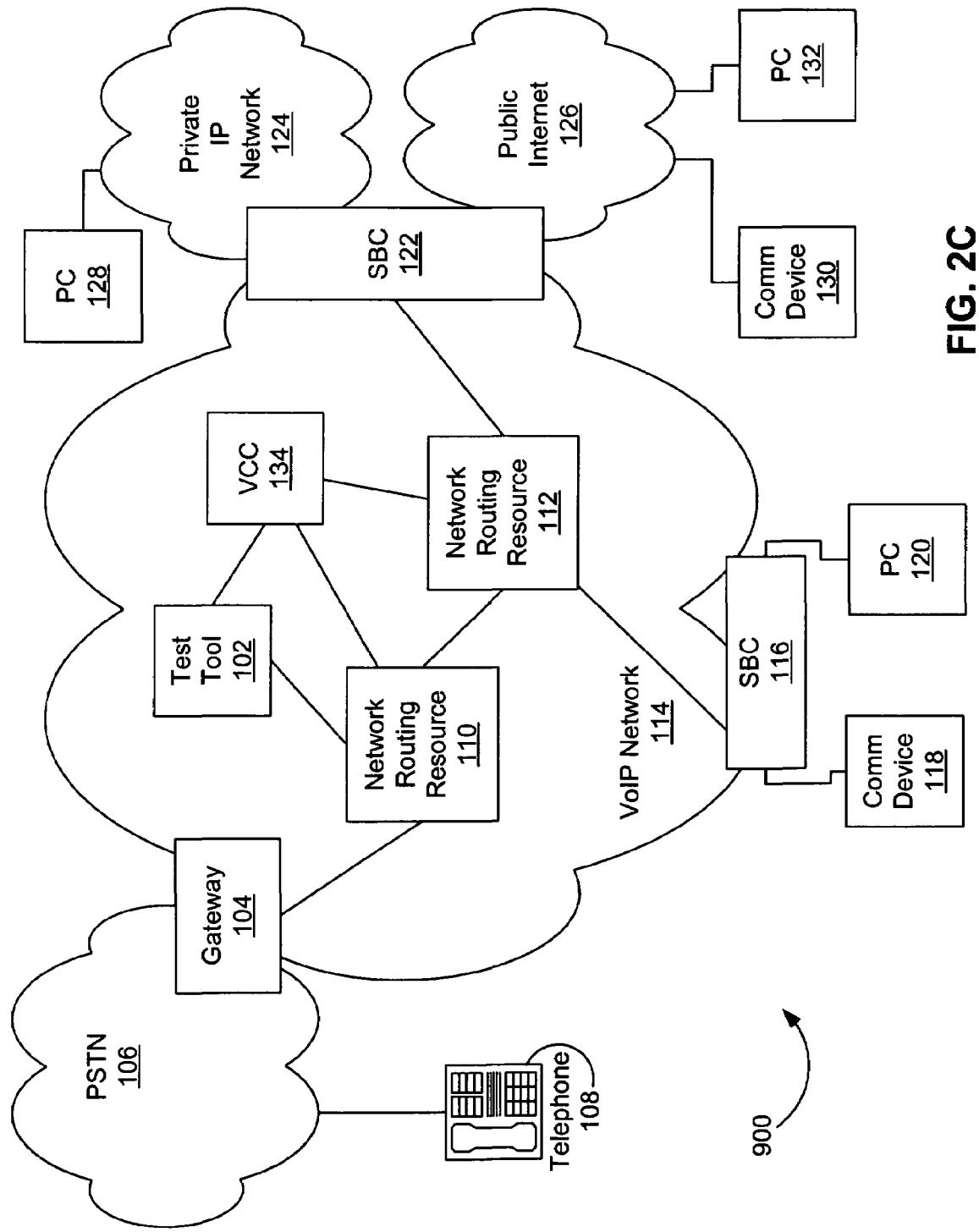
FIG. 2C depicts a system for verifying the routing of a call and/or collecting signaling information from a call through a network in accordance with various embodiments of the present invention.

Turning to FIG. 2C, a system 900 for verifying the routing of a call and/or collecting signaling information from a call through a network in accordance with various embodiments of the present invention is depicted. Test tool 102 may also be communicably coupled to VCC 134. VCC 134 resides within VoIP network 114, and is communicably coupled to test tool 102, network routing resource 110, and/or network routing resource 112. According to some embodiments, VCC 134 is operable to collect, analyze, and/or display call tracking information for calls, including a test call. VCC 134 may comprise, for example, a software module executed by a computer, with VCC 134 outputs displayed on a computer monitor.

In the interest of quality control, the operators of VoIP network 114 may wish to collect tracking information for the call to verify that the call has been routed correctly. For instance, operators may wish to verify that the most direct and/or most efficient path was used to route the call from network routing resource 110 to network routing resource 112 (if other than the direct path shown in FIG. 2C). VCC 134 may be configured to collect tracking information for such a call.

VCC 134 may also work with test tool 102 in a coordinated fashion to retrieve and analyze call signaling information for failed test calls to determine the cause of failure, or for test calls that were successfully re-routed back to test tool 102 to determine whether the correct or most efficient routing procedures were used. In a typical scenario, once test tool 102 receives the re-routed call, test tool 102 ends the call. In some embodiments, once test tool 102 receives the re-routed call, test tool 102 sends the call to VCC 134 for collection and/or analysis of call tracking information for the call. If the call is placed to destination number without having been re-routed back to test tool 102, test tool 102 ends the call. For example, if test tool 102 determines that a test call is ringing at the destination number, test tool 102 ends the call, and may also send an indication to VCC 134 that the call was not routed correctly, so that VCC 134 may collect, analyze, and/or display tracking information for the call. Alternatively, if test tool 102 determines that the test call was not routed correctly, test tool 102 may initiate a request to VCC 134 to collect, analyze, and/or display tracking information for the call. Alternatively, if test tool 102 determines that the test call was not routed correctly, test tool 102 may indicate the routing failure to a user by providing one or more parameters to be input to VCC 134 by the user. In cases where test tool 102 determines that the test call was not routed correctly, test tool 102 may make a record indicating that the particular test call and/or the particular destination number have not been routed correctly to, from, and/or through VoIP network 114.

Figure 2D:
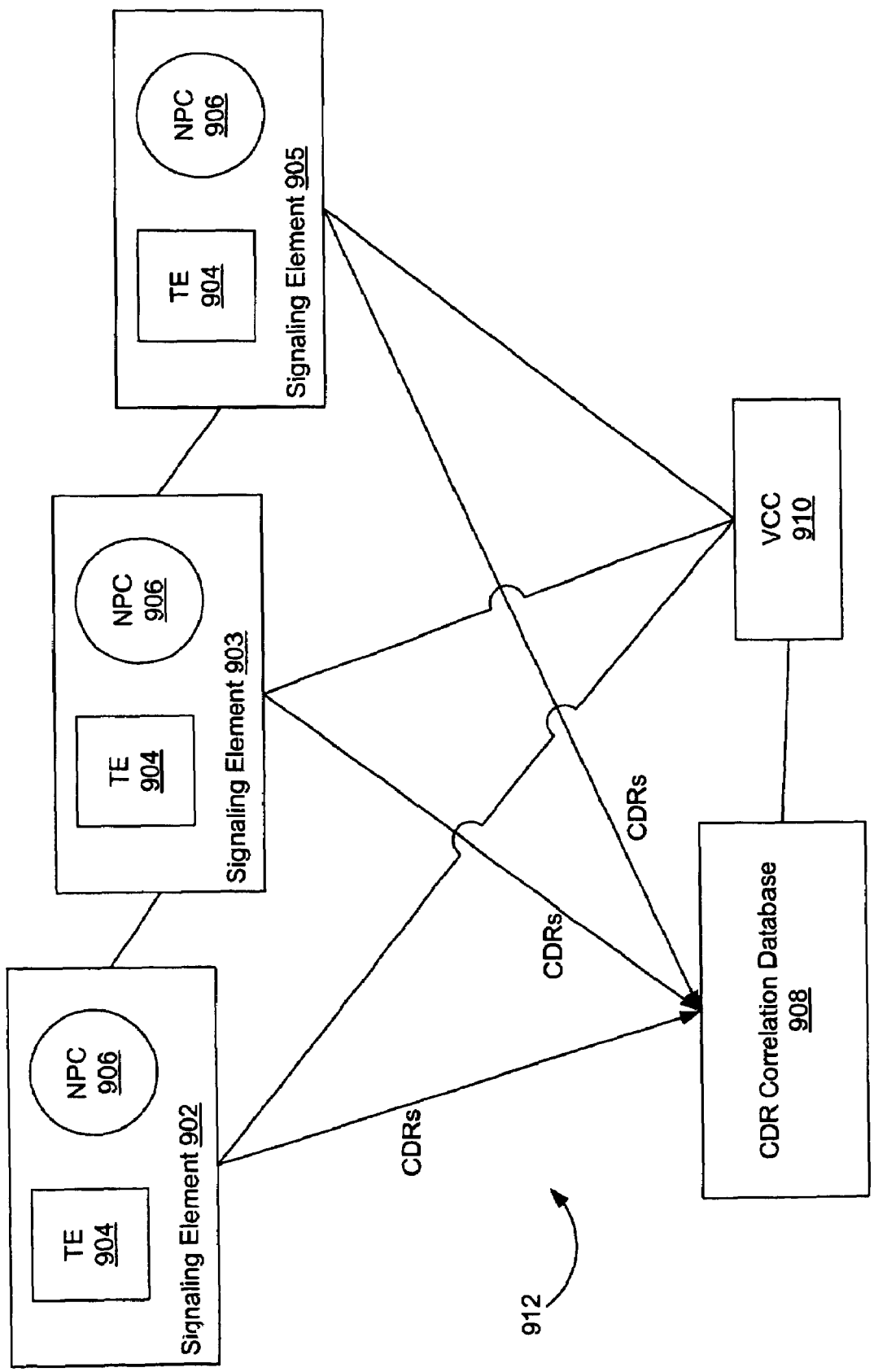
FIG. 2D depicts a system for verifying the routing of a call and/or collecting signaling information from a call in accordance with various embodiments of the present invention.

Turning to FIG. 2D, a system 912 for verifying the routing of a call and/or collecting signaling information from a call in accordance with various embodiments of the present invention is depicted. System 912 may include one or more signaling elements 902, 903, 905, a CDR correlation database 908, and a voice call coordinator 910. One or more signaling elements 902 may include a timing element ("TE") 904 and a network protocol collector ("NPC") 906. Signaling element 902 may include, but is not limited to, a network routing resource, a media gateway, a media gateway controller, a session border controller, a gateway, an SS7 gateway, a gateway controller, a softswitch, a proxy server, or a feature server. Signaling elements 902, 903, 905 may be communicably coupled to CDR correlation database 908, VCC 910, and/or each other. For example, signaling elements 902, 903, 905, CDR correlation database 908, and VCC 910 may be communicably coupled via a network, such as an IP network.

According to some embodiments of the present invention, as network traffic passes to, from, and/or through signaling elements 902, 903, 905, and in particular through signaling element 903, NPC 906 observes and makes records of the call signaling for each call passing through signaling element 903. For example, NPC 906 "snoops" all ethernet level traffic happening on signaling element 903. The term "signaling information" may, in some alternative embodiments, refer to raw data or ethernet packets observed and/or recorded by NPC 906. TE 904 is operable to create a time index for each signaling event, permitting NPC 906 to associate call signaling events with a particular time for recordation. NPC makes and stores a record of each signaling event, along with a corresponding time stamp. At least in part through the operation of NPC 906 and TE 904, signaling element 903 creates a Call Detail Record ("CDR") for each call handled by signaling element 903.

A CDR represents information about a telephone call, such as a VoIP call. For instance, a CDR includes, but is not limited to, GRC/DRC information, device identification information, the calling party information and the called party information for the call, the call offer time, the call complete time, the SIP call ID, and/or information about the trunks associated with the call. A CDR may include a "start packet," a "stop packet," and/or an "attempt" packet representing a record of calls that failed. Once signaling element 903 has created a CDR for a particular call, it sends the CDR to CDR correlation database 908. Similarly, signaling elements 902, 905 each send a CDR to CDR correlation database 908 for each call handled. According to some embodiments of the present invention, CDR correlation database 908 stores each CDR received from each signaling element 902, 903, 905.

In a typical scenario, one or more criteria are supplied to VCC 910. For example, one or more criteria are supplied and/or chosen by a user or network operator through a user interface to VCC 910. VCC 910 queries CDR correlation database 908 to retrieve all CDRs that satisfy the criteria. For instance, if the criteria is a certain called party number over a specified time frame, (e.g., between the hours of noon and 2:00 pm on a particular day) then VCC 910 queries CDR correlation database 908 to retrieve all CDRs stored by CDR correlation database 908 corresponding to the certain called party number and the specified time frame. The criteria may be defined as any one or more fields contained within CDRs, such as, for example, the calling party number, the called party number, or the call identification number fields. Each CDR identifies the signaling element 902, 903, 905 that created it.

Once VCC 910 has retrieved the CDRs satisfying the desired criteria, VCC 910 processes and/or analyzes the CDRs to determine which signaling elements 902, 903, 905 handled each particular call. For example, if multiple calls satisfy the criteria, VCC 910 may sort or group the CDRs based on their call identification fields and then determine which signaling elements 902, 903, 905 handled each call. Alternatively, CDR correlation database 908 may supply VCC 910, in response to VCC's 910 query, with a correlated record of all CDRs corresponding to the same call. Based on the CDRs and/or the correlated record of all CDRs corresponding to the same call, VCC 910 may determine, for each call satisfying the criteria: A) the devices or signaling elements 902, 903, 905 that handled the call, B) the time frame for the call, such as the call offer time and/or the call complete time, and/or C) the unique identification of each call.

Using the determinations made from the CDRs and/or correlated record of CDRs corresponding to the same call, VCC 910 queries each signaling element 902, 903, 905 that handled the call for detailed signaling information about the call. For example, VCC 910 sends a request to NPC 906 of signaling element 903 for all signaling information related to a particular call over a specified time period. According to some embodiments, VCC 910 sends a request to NPC 906 of signaling element 903 for data or ethernet packets collected over a specified time period. NPC 906 gathers the requested signaling information and/or data packets based on the time stamp provided by TE 904, and then sends the requested signaling information to VCC 910. Signaling information stored for a particular signaling element 903 may include, but is not limited to, SS7 signaling information, IPDC signaling information, or SIP signaling information.

Once VCC 910 has retrieved signaling information for one or more calls satisfying the original criteria, VCC 910 organizes the signaling information. According to various embodiments of the present invention, when VCC 910 has retrieved ethernet or data packets from NPC 906, it reconstructs from the raw packets the signaling events for the specified call. According to some embodiments, VCC 910 is operable to display the signaling information to a user or network operator, such as, for example, via a graphical user interface. In some embodiments, VCC 910 displays signaling information based on the CDRs or the correlated record of CDRs corresponding to a call; in other cases, VCC 910 displays more detailed signaling information obtained from signaling elements 902, 903, 905. For example, VCC 910 may display an icon and/or a line representing each signaling element 903, as well as sets of arrows identifying the types of signaling messages and showing the path between and among signaling elements 902, 903, 905 taken by one or more signaling messages. As another example, VCC 910 may display signaling information in a table format organized by signaling element 903, showing the signaling messages sent and received by each signaling element 903. As yet another example, VCC 910 may display signaling information for at least one signaling element 903, focusing on the one signaling element 903 and depicting or listing the signaling messages to, from, and/or within that one signaling element 903.

According to some embodiments of the present invention, a configuration of system 912, whereby CDRs for each call, instead of the full set of signaling information, are sent to CDR correlation database 908, may increase the efficiency and speed of system 912, and may allow VCC 910 to display signaling in real-time or nearly real-time. Transferring a subset or summary of signaling information embodied in a CDR from signaling element 903 to CDR correlation database takes less time than transferring a larger or more bulky full set of signaling information, and may require less bandwidth. Such a system may also prevent CDR correlation database 908 from growing into a central, massive, slower database because it stores CDRs instead of all signaling information for each call. For similar reasons, VCC 910 may more quickly identify signaling elements 902, 903, 905 involved in a call, and may save bandwidth and time by pulling more detailed signaling information from signaling elements 902, 903, 905 only when such detailed signaling information is related to specified criteria. Accordingly, VCC 910 may display a call flow to a user in seconds, rather than the hours or days previously taken to manually reconstruct call flows.

VCC 910 may receive manual criteria for obtaining and displaying signaling information; alternatively, VCC 910 may execute automatic queries or testing. For example, VCC 910 may be configured to automatically obtain signaling information for a specific phone number or group of phone numbers over a given time period, or at certain times of the day. VCC 910 may be employed for network troubleshooting. From the signaling information obtained from signaling elements 902, 903, 905, and/or CDRs stored in CDR correlation database 908, VCC 910 may be operable to create a sequence diagram that visually shows signaling across all elements that were involved in processing the call. In addition to potential troubleshooting uses of VCC 910, VCC 910 may also permit the generation of CDRs independent of device vendors; for example, VCC 910 may collect and display signaling information generated by third-party signaling elements or devices. In this way, VCC 910 may identify chronic network problems as they occur. According to some embodiments of the present invention, VCC 910 is operable to reconstruct each TCP stream involved in a call, convert raw packet information into streams, and read sockets that may be of particular interest for reconstructing a call flow.

Some embodiments of the present invention provide a software solution to tracking, collecting, and/or displaying signaling information, instead of a hardware solution. According to some embodiments, such a solution may employ a SIP-based application operable to create CDRs; such a solution would not require the often expensive process of gathering signaling information by physically plugging a probe into an ethernet switch via a span port or conducting optical testing by splicing fiber optic cables through which signaling travels.

Figure 3A:
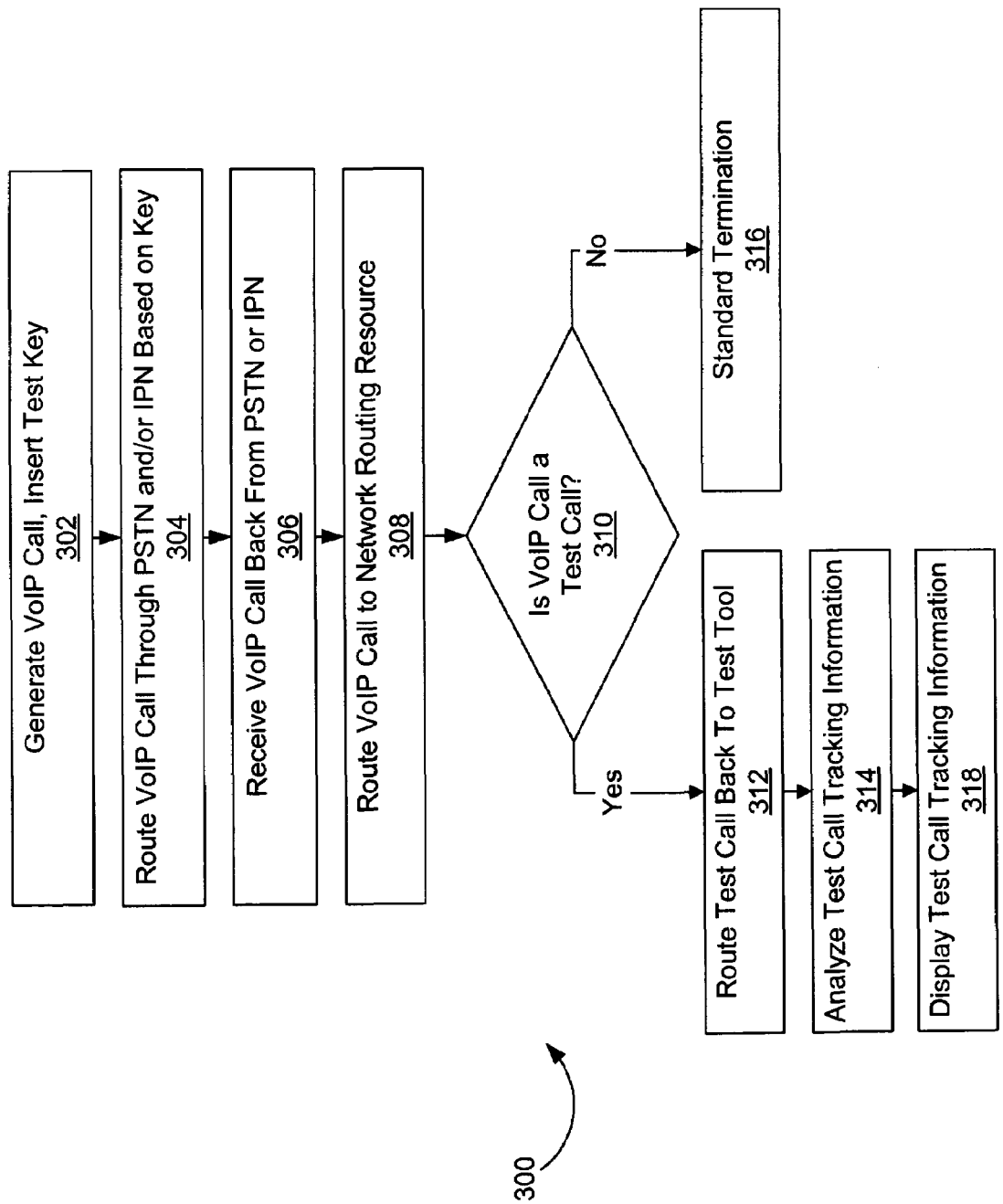
FIG. 3A depicts methods for verifying the routing and/or collection of signaling information from a call through a network in accordance with various embodiments of the present invention.

Turning now to FIG. 3A, a flow diagram 300 depicting a method for verifying the routing and/or collection of signaling information from a call through a network in accordance with various embodiments of the present invention is provided. Following flow diagram 300, test tool 102 generates a VoIP call and selects a test key (block 302). When initiating a test call, test tool 102 creates a test key associated with the test call. The test key may be created, for example, in an origination number field. The call is routed through PSTN 106 and/or IP network ("IPN") based on the test key (block 304). Network routing resource 110 receives the call from test tool 102. In some embodiments, network routing resource 110 is configured to send all outbound calls to PSTN 106, whether or not the outbound calls are to phone numbers associated with VoIP network 114. In other instances, network routing resource 110 is configured to send only those outbound calls possessing a predetermined test key to PSTN 106. In other words, network routing resource 110 evaluates the origination and destination numbers and routes the call to the destination number unless the origination number is a test key. Based on the disclosure provided herein, one of ordinary skill in the art will appreciate a variety of routing procedures that network routing resource 110 may be configured to perform based on various possible test keys.

Network routing resource 110 sends the call to PSTN 106 through gateway 104. Gateway 104 receives the call in the form of a SIP message. Gateway 104 then sends the call through PSTN 106. At this point, at least two possibilities could occur. If PSTN 106 is incorrectly configured to send the test call to a destination not associated with VoIP network 114, the test call will travel through PSTN 106 to a telephone 108 that is actually associated with the particular phone number. Alternatively, if PSTN 106 is correctly configured to send the test call back to VoIP network 114, the test call will re-enter VoIP network 114 through gateway 104.

If PSTN 106 is incorrectly configured to send the test call to a destination not associated with VoIP network 114, the test call travels through PSTN 106 to telephone 108. A ringing is initiated at telephone 108. An indication that ringing has commenced travels from telephone 108 through PSTN 106, back to gateway 104. Gateway 104 receives the ringing signal call, and sends the call to network routing resource 110. According to one embodiment, network routing resource 110 accesses the test key, and based upon the test key and/or the existence of a test key, network routing resource 110 routes the call back to test tool 102. Test tool 102 determines whether the test call was placed without coming back into VoIP network 114. For instance, test tool 102 determines whether the test call is ringing at the destination phone number. If the test call rings at the destination phone number, test tool 102 may release the call. Alternatively, if the test call rings at the destination phone number, test tool 102 may ignore the ringing message. Test tool 102 may also, but need not necessarily, make a record of and/or display the status of the destination phone number as incorrectly routed or improperly provisioned by PSTN 106.

Alternatively, if PSTN 106 is correctly configured, PSTN 106 recognizes that the destination number is associated with VoIP network 114. PSTN 106 then sends the test call back to VoIP network 114, allowing it to re-enter VoIP network 114 through gateway 104. Gateway 104 receives the test call and sends it to network routing resource 110. According to some embodiments, network routing resource 110 is configured to receive the test call in the form of an inbound call, access the test key, and route the inbound call to test tool 102. According to various other embodiments, network routing resource 110 is configured to receive the test call in the form of an inbound call, and route the inbound call to another network routing resource 112 based on the destination number. For instance, network routing resource 110 is operable to determine that network routing resource 112 is associated with the destination number, and accordingly to route the call to network routing resource 112. Network routing resource 112 can be, but is not limited to, a feature server on an edge of the network associated with the particular destination number referenced in the call. Instead of re-routing the call back to test tool 102 after network routing resource 110, continuing to route the call through VoIP network 114 to a far edge of VoIP network 114 allows VCC 134 to collect a more comprehensive set of tracking information.

Continuing to follow flow diagram 300, the call is received back from PSTN 106 or IPN (block 306), and routed to a network routing resource 110 (block 308). Network routing resource 110 determines whether the call is a test call (block 310). Network routing resource 110 determines whether the call is a test call by accessing the test key. According to some embodiments of the present invention, network routing resource 110 stores one or more test keys used by test tool 102 for test calls, accesses the test key of a VoIP call, and compares the accessed test key of the VoIP call with the one or more stored test keys to determine whether the call is a test call. If the VoIP call is a test call, the test call is routed back to test tool (block 312). Test tool 102 may then send the test call to VCC 134, for analysis (block 314) and/or display (block 318) of the test call tracking information. For instance, test tool 102 may send an indication to VCC 134 that test call was successfully re-routed back to test tool 102, along with identifying information for the test call to allow VCC 134 to collect, analyze, and/or display call tracking information. If the VoIP call is not a test call, the call is terminated in the standard fashion (block 316), such as by routing the call to the destination number.

According to some embodiments, network routing resource 112 is configured to receive the test call from network routing resource 110 in the form of an inbound call, access the test key, and route the inbound call to test tool 102. Network routing resource 112 may be configured to determine, once the test key is accessed and the call is determined to be a test call, whether network routing resource 112 is the last call routing device before the call would normally be sent out of VoIP network 114. Based on such a determination, network routing resource 112 can be configured to route the inbound call back to test tool 102. According to some embodiments, SBC 122 or SBC 116, rather than network routing resource 112, is configured to make such a determination and/or route test calls back to test tool 102 based on the test key. Just as network routing resource 110 can be configured to route outbound calls according to the existence and/or content of the test key, so too can network routing resources 110 and/or 112 be configured to route inbound calls based on the test key. Based on the disclosure provided herein, one of ordinary skill in the art will appreciate a variety of routing procedures that network routing resources 110 and/or 112 may be configured to perform based on various possible test keys.

When the call is routed back to test tool 102 (block 312), test tool 102 recognizes the call as a test call. For example, test tool 102 may recognize the call as a test call by parsing the origination number from the call and determining if the origination number is the test key. In these instances, test tool 102 distinguishes different test calls by creating each test call with a different test key. Alternatively, test tool 102 distinguishes different test calls based on each call's unique call identification information. Test tool 102 may store each test key, along with call-specific information, in a database upon call initiation for later retrieval to identify a received call. When test tool 102 receives an incoming call and identifies the incoming call as a test call, test tool 102 ends the call; this prevents the call from being routed to and/or ringing at the destination number.

VCC 134 may analyze the test call tracking information (block 314) in various ways. In one embodiment of the present invention, each device that handles the call maintains a log. In the log, each device records, among other things, call identification information unique to each call, the action taken with respect to the call, and a time when the action was taken. In some cases, these records may be Call Detail Records. The time when the action was taken may be referred to as a time stamp. Upon the happening of a particular event, such as the call leaving the VoIP network 114, a device, such as SBC 122, sends the identification information for the call to VCC 134 and/or test tool 102, as well as an indication that the call has passed out of the VoIP network 114. Test tool 102, upon receiving an inbound call and identifying the inbound call as a test call, is configured to end the call and send a notification to VCC 134 that test call was successfully re-routed back to test tool 102. VCC 134 may be configured to send a request to at least one network device, such as network routing resource 110, for call log information relating to a specific test key and/or a specific call identification number.

By obtaining call log information from various network devices, VCC 134 acquires tracking information for the test call. VCC 134 may obtain tracking information for the outbound call and the inbound call portions of the test call. VCC 134 analyzes the tracking information to, for instance, arrange the tracking information in chronological order. The tracking information may also be used to determine whether the test call was routed through a particular path, such as the fastest, least expensive, and/or most efficient network path. VCC 134 can be configured to display the tracking information to a user and/or VoIP network 114 operator. VCC 134 may also be similarly configured to collect, analyze, and/or display call tracking information not only for test calls, but also for other calls such as normal calls passing through VoIP network 114.

In cases where the test call generated by test tool 102 is not re-routed correctly back to test tool 102, such as cases where the test call is completed to telephone 108 associated with PSTN 106, VCC 134 may obtain tracking information for the test call to view and troubleshoot routing paths. For example, where the test call is not routed properly, test tool 102 makes a record indicating that test call was not routed back to test tool 102. According to some embodiments of the present invention, test tool 102 may send this indication to VCC 134 so VCC 134 may collect call tracking information for the test call. The tracking information may also be used to determine or pinpoint which network device began or was responsible for the incorrect routing. According to alternative embodiments, VCC 134 sends test tool 102 an instruction to generate a test call, and test tool 102 may be configured to send all incoming test calls to VCC 134; in this way, VCC 134 tracks whether each test call was re-routed correctly. In yet other embodiments, VCC 134 and test tool 102 are implemented with software modules on the same computer workstation.

In other embodiments of the present invention, VCC 134 tracks call activity related to a particular phone number. To accomplish this, VCC 134 sends to various network devices an indication of the particular phone number and an instruction to send all call routing information related to the particular phone number to VCC 134. As each network device processes and/or routes the call, each network device sends the call information, and the call routing information, to VCC 134. VCC 134 then collects, organizes, and/or analyzes the tracking information. VCC 134 analyzes the tracking information to, for instance, arrange the tracking information in chronological order. VCC 134 can be configured to display the tracking information to a user and/or VoIP network 114 operator.

In various other embodiments of the present invention, each network device that receives and/or routes the call appends to the call information about how the call was routed, which particular device handled the call, and/or when the particular device handled the call. One of the network devices, such as network routing resource 112, may be configured to send the call to test tool 102. When test tool 102 receives the call, test tool 102 may send the call, or identifying information for the call, to VCC 134. VCC 134 analyzes the call to parse and organize the tracking information appended to the call. VCC 134 analyzes the tracking information to, for instance, arrange the tracking information in chronological order. VCC 134 can be configured to display the tracking information to a user and/or VoIP network 114 operator.

VCC's 134 analysis of tracking information (block 314) may also include calculation of signaling latency. For example, VCC 134 may calculate the signaling latency for the routing of a call from network routing resource 110 to network routing resource 112 by subtracting the time stamp stored in network routing resource's 110 call log from the time stamp stored in network routing resource's 112 call log. Signaling latency calculations and/or time stamp information allow VCC 134 to calculate or estimate post-dialing delay. Post-dialing delay is an amount of time between the dialing of a destination number and the return of a ringing signal. VCC 134 calculates post-dialing delay by, for instance, subtracting the time a call was initiated by test tool 102 from the time stamp indicating when the call was about to leave VoIP network 114 to connect to communication device 130.

VCC 134 can be further configured to display the tracking information for one or more test calls to a user and/or VoIP network 114 operator. VCC 134 may accomplish this by being communicably coupled to a graphical output device, such as a computer monitor, creating a sequence diagram showing the tracking information, and displaying the sequence diagram on the graphical output device. As one example, VCC 134 displays an icon for each network device handling a particular test call, along with the action taken by each device and the time such action was taken. As another example, VCC 134 displays signaling latency information between specific network devices for various test calls.

VCC 134 and/or test tool 102 may also be configured to automatically verify routing of calls. For instance, test tool 102 may be configured to generate test calls at random intervals, and send the test calls (or identifying information for the test calls) to VCC 134 for analysis of the test calls. VCC 134 may be configured, for instance, to generate an alert upon a predetermined signaling latency increase.

In addition to generating calls for the purpose of verifying the correct routing of calls from PSTN 106, test tool 102 may also initiate test calls that do not leave VoIP network 114. Test tool 102 selects a particular test key while initiating the test call, selects a destination number associated with VoIP network 114 (such as the destination number associated with PC 128), and sends the call to network routing resource 110. According to some embodiments, network routing resource 110 may be configured to access the test key and route the call normally based on the test key. Other devices, such as network routing resource 112 and/or SBC 122, may be configured to access the test key, determine whether they are the last device that would normally handle the call within VoIP network 114, and route the call back to test tool 102 based on an affirmative determination. According to other embodiments, test tool 102 instructs network routing resource 110 whether to route the test call to PSTN 106 or to the test call's normal destination. According to various embodiments, test tool 102 not only initiates and sends calls to network routing resource 110, but is also communicably coupled with one or more VoIP network 114 devices to provide instruction about how to handle particular calls and/or calls with particular test keys. VCC 134 may also be communicably coupled with one or more VoIP network 114 devices to provide instruction about how to handle particular calls and/or calls with particular test keys. According to such embodiments, VCC 134 collects call tracking information directly from network devices.

Figure 3B:
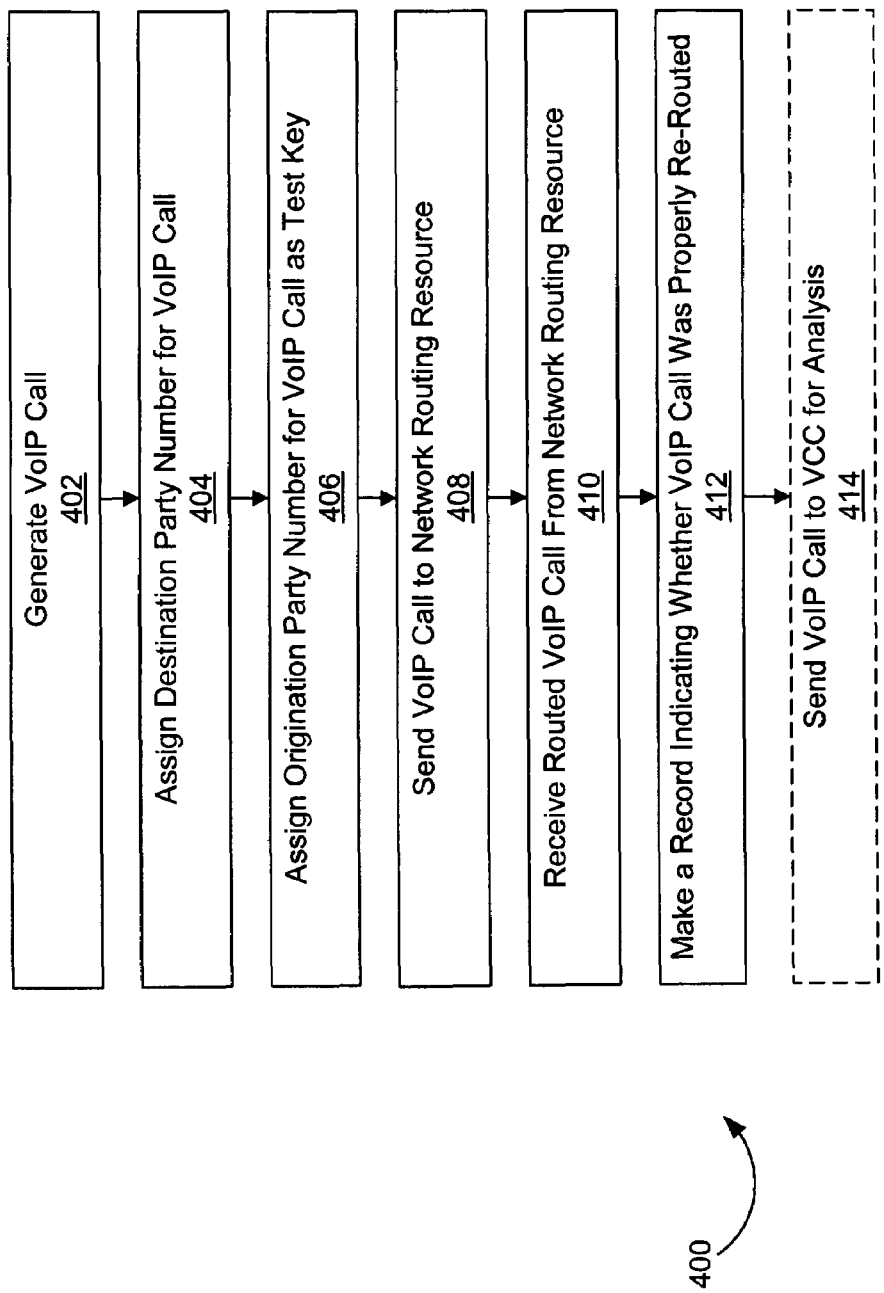
FIG. 3B depicts methods for verifying the routing and/or collection of signaling information from a call through a network in accordance with various embodiments of the present invention.

Turning now to FIG. 3B, a flow diagram 400 depicting another method for verifying the routing of a call through a network, according to various embodiments of the present invention, is provided. Flow diagram 400 illustrates a method similar to that of flow diagram 300, from the perspective of test tool 102. Following flow diagram 400, test tool 102 generates a VoIP call (block 402). Test tool 102 may also assign a destination party number for the call (block 404). In place of the origination party number, test tool 102 may also assign a test key for the call (block 406). Test tool 102 sends the call to a network routing resource 110 (block 408). The call is routed by network routing resource 110. Test tool 102 receives the routed call back from network routing resource 110 or 112 (block 410). Test tool 102 makes a record indicating whether the VoIP call was properly re-routed back to test tool 102 (block 412). Optionally, test tool 102 may send the VoIP call to VCC 134 for retrieval and/or analysis of tracking information (block 414).

Figure 3C:
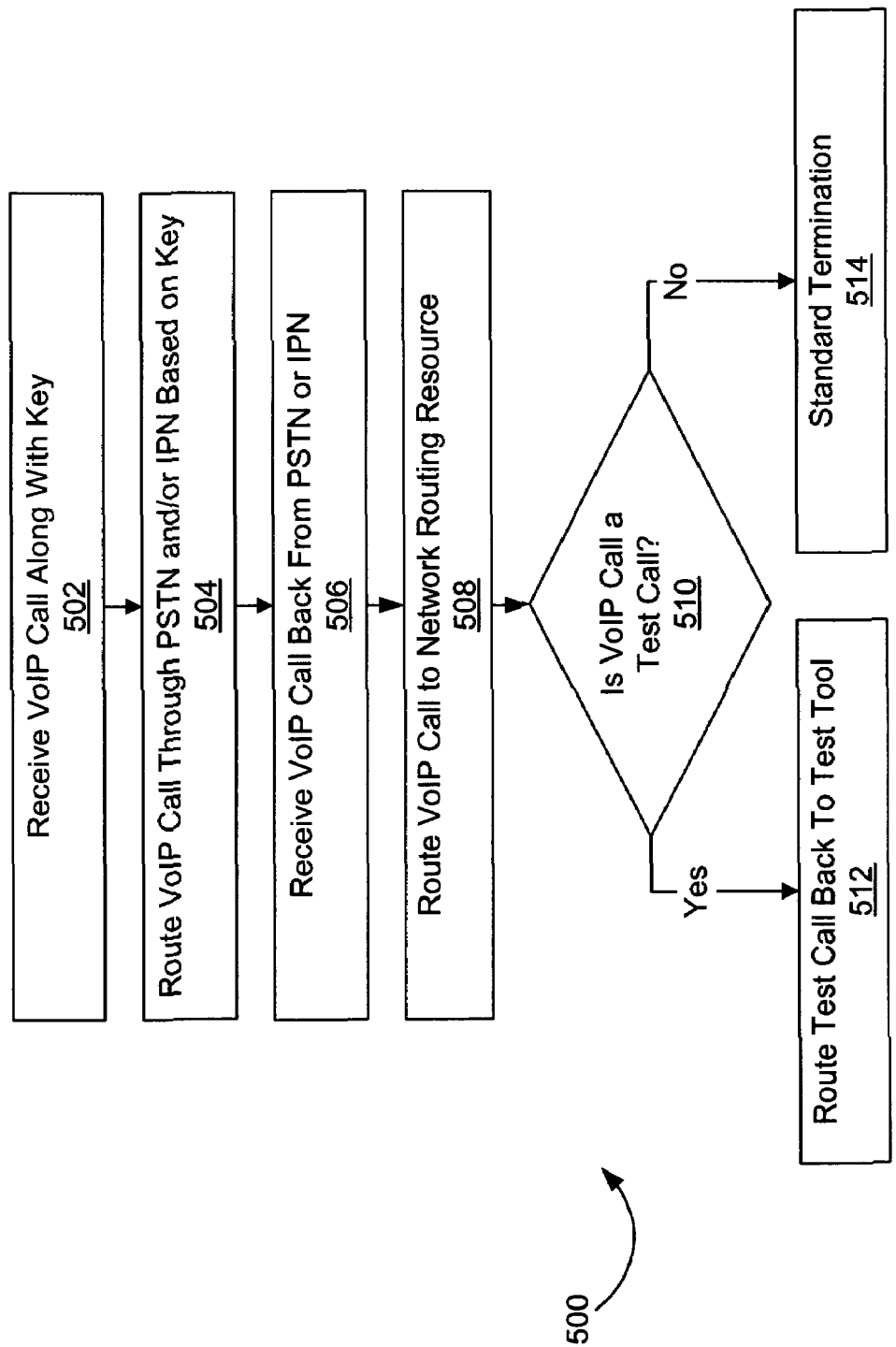
FIG. 3C depicts methods for verifying the routing and/or collection of signaling information from a call through a network in accordance with various embodiments of the present invention.

Turning now to FIG. 3C, a flow diagram 500 depicting yet another method for verifying the routing of a call through a network, according to various embodiments of the present invention, is provided. Flow diagram 500 illustrates a method similar to that of flow diagram 300, from the perspective of network routing resources 110 and/or 112. Following flow diagram 500, network routing resource 110 receives a VoIP call along with a key (block 502). This call may be received from test tool 102, and the key may be a test key. Network routing resource 110 routes the call through the PSTN and/or IPN based on the key (block 504). The call is routed, and received back from the PSTN or IPN (block 506). Optionally, network routing resource 110 routes the call to another network routing resource 112 (block 508). For instance, the first network routing resource 110 may be a softswitch that routes the call to another network routing resource 112, such as a feature server. One of the network routing resources 110, 112 determines whether the VoIP call is a test call (block 510). If the VoIP call is a test call, the call is routed back to a test tool 102 (block 512). If the VoIP call is not a test call, the call is terminated in the standard fashion (block 514), such as by routing the call to the destination number.

Figure 4A:
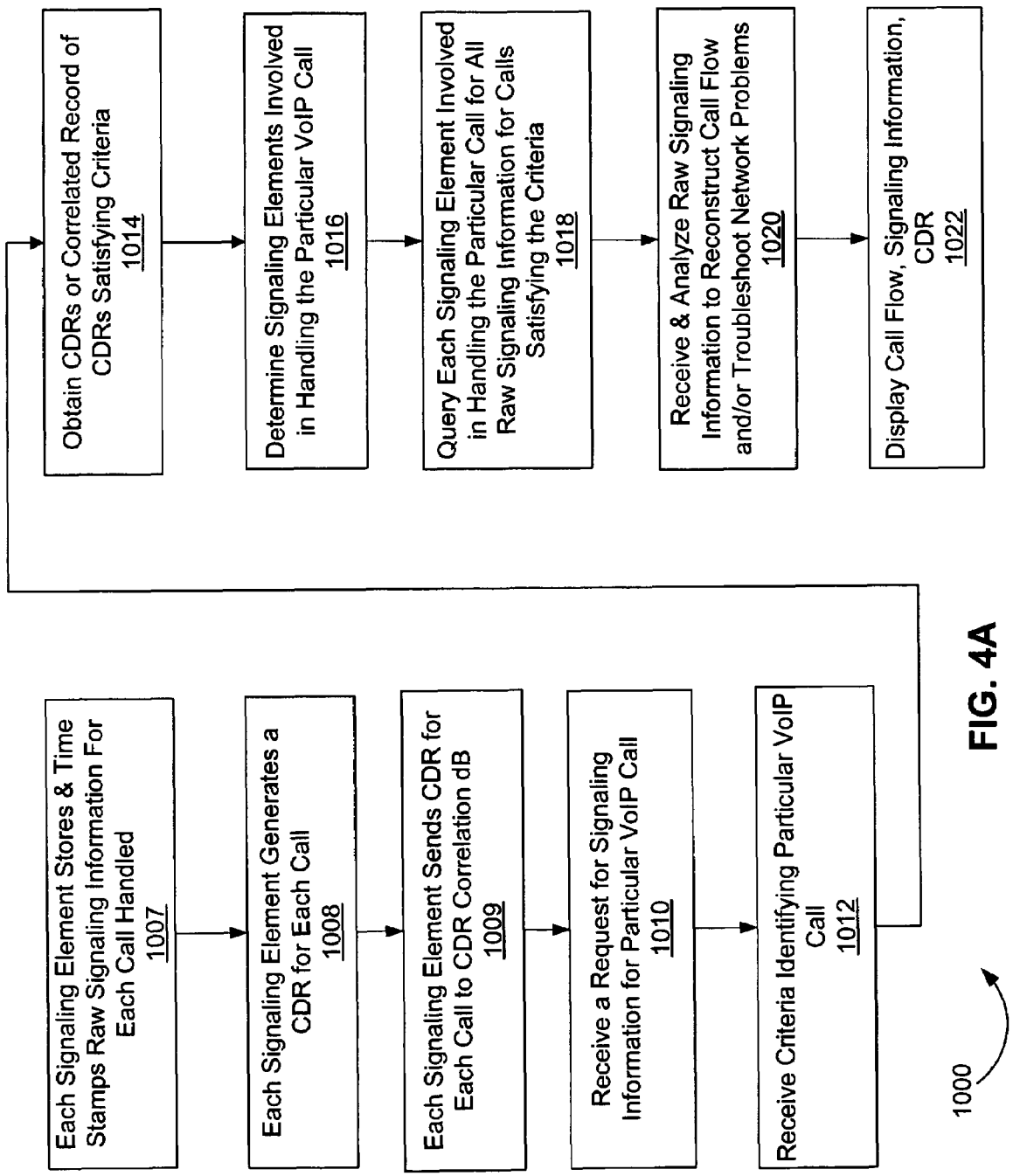
FIG. 4A depicts methods for collection of signaling information from a call in accordance with various embodiments of the present invention.

According to some embodiments of the present invention, VCC 134 or 910 may operate to obtain signaling information not only for test calls, but for any calls that pass through VoIP network 114 and/or a combination of VoIP network 114 and an SS7 network such as PSTN 106. Turning now to FIG. 4A, a flow diagram 1000 depicts a method for collection of signaling information from a call through a network in accordance with various embodiments of the present invention. Following flow diagram 1000, each signaling element 903 that handles a call stores and time stamps raw signaling information for each call handled (block 1007). Each signaling element generates a CDR for each call (block 1008), and sends the CDR for each call to a CDR correlation database (block 1009). VCC 134 or 910 receives a request for signaling information for a particular VoIP call (block 1010), and receives criteria identifying the particular VoIP call or group of VoIP calls (block 1012). For example, a network operator may view a list of calls placed through VoIP network, sorted by, for instance, origination number, destination number, or Call ID. The network operator may select one or more calls; the selection of the call initiates a request sent to VCC 134 or 910 for signaling information about the call. In other embodiments of the present invention, the request for signaling information for a particular VoIP call may come from test tool 102 when the VoIP call is a test call.

VCC 134 or 910 obtains, from CDR correlation database 908, CDRs or correlated records of CDRs that satisfy the criteria (block 1014). Based at least in part on the CDRs or correlated records of CDRs, VCC 134 or 910 determines which signaling elements were involved in handling the particular VoIP call (block 1016). VCC 134 or 910 queries each signaling element involved in handling the particular VoIP call to request all raw signaling information for calls that satisfy the criteria (block 1018). VCC 134 or 910 may obtain the signaling information for the VoIP call in ways similar to the various ways that VCC 134 or 910 obtains signaling information for test calls, as described above. For example, according to some embodiments of the present invention, each device that handles the call maintains a log. In the log, each device records, among other things, call identification information unique to each call, the action taken with respect to the call, and a time when the action was taken. In some cases, these records may be Call Detail Records. In some cases, these records may be raw signaling information or data. The time when the action was taken may be referred to as a time stamp. VCC 134 or 910 may be configured to send a request to at least one network device, such as network routing resource 110, for call log information relating to a specific call identification number and/or phone number. This may be done, for example, by initiating a query to each or all network devices identifying one or more call IDs or phone numbers and instructing the network device to send to VCC 134 or 910 all data associated with the call ID or phone number. In such a way, VCC 134 or 910 acquires signaling information for the call. The signaling information may include, but is not limited to, SS7, IPDC, and/or SIP information. Signaling information may be obtained from network devices within VoIP network 114, such as network routing resource 110; in some cases, signaling information may also be obtained from network devices in other networks external to VoIP network 114, such as PSTN 106, private IP network 124, and/or public internet 126.

Once VCC 134 or 910 receives the raw signaling information, it analyzes the raw signaling information to reconstruct a call flow and/or troubleshoot network problems (block 1020). VCC 134 or 910 may also display call flows, signaling information, CDRs, and other graphical constructions that correspond to the signaling information from each signaling element and/or network device (block 1022).

VCC 134 or 910 may analyze the tracking information to, for instance, arrange the signaling information in chronological order. The signaling information may also be used to determine whether the call was routed through a particular path, such as the fastest, least expensive, and/or most efficient network path. VCC's 134 or 910 analysis of tracking information (block 1020) may also include calculation of signaling latency. For example, VCC 134 or 910 may calculate the signaling latency for the routing of a call from network routing resource 110 to network routing resource 112 by subtracting the time stamp stored in network routing resource's 110 signaling log from the time stamp stored in network routing resource's 112 signaling log. Signaling latency calculations and/or time stamp information allow VCC 134 or 910 to calculate or estimate post-dialing delay. VCC 134 or 910 calculates post-dialing delay by, for instance, subtracting the time a call was initiated by communication device 130 from the time stamp indicating when the call was about to leave VoIP network 114 to connect to communication device 118.

VCC 134 or 910 may be configured to display the signaling information and/or analysis to a user and/or VoIP network 114 operator (block 1022). VCC 134 or 910 may be communicably coupled to a graphical output device. VCC 134 or 910 may create and display a sequence diagram showing the signaling information. For example, VCC 134 may display an icon for each network element that processed the call and show a connected path between the icons representing the routing and/or signaling path of the call, with a summary next to each icon about how the particular network element handled the call. Alternatively, VCC 134 or 910 may display the signaling information in the form of a table, chart, or graph sorted by one or more parameters such as origination number or destination number.

Figure 4B:
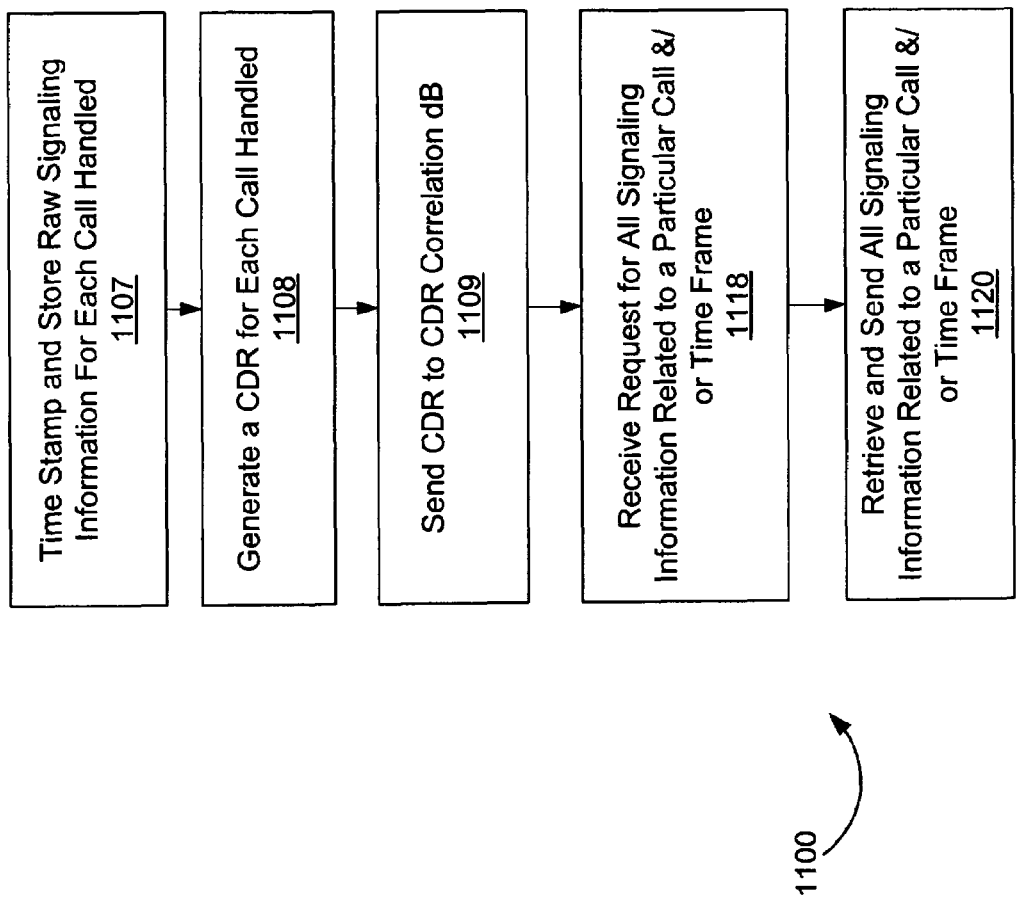
FIG. 4B depicts methods for collection of signaling information from a call in accordance with various embodiments of the present invention.

Turning now to FIG. 4B, a flow diagram 1100 depicts a method for collection of signaling information from a call through a network, from a perspective of a signaling element, in accordance with various embodiments of the present invention. The signaling element time stamps and stores raw signaling information for each call handled by the signaling element (block 1107). The signaling element generates a CDR for each call handled by the signaling element (block 1108), and sends the CDR to a CDR correlation database (block 1109). The signaling element also receives from a VCC a request for all signaling information related to a particular call and/or time frame (block 1118). The signaling element retrieves and sends back to the VCC all signaling information related to the particular call and/or time frame (block 1120).

Figure 4C:
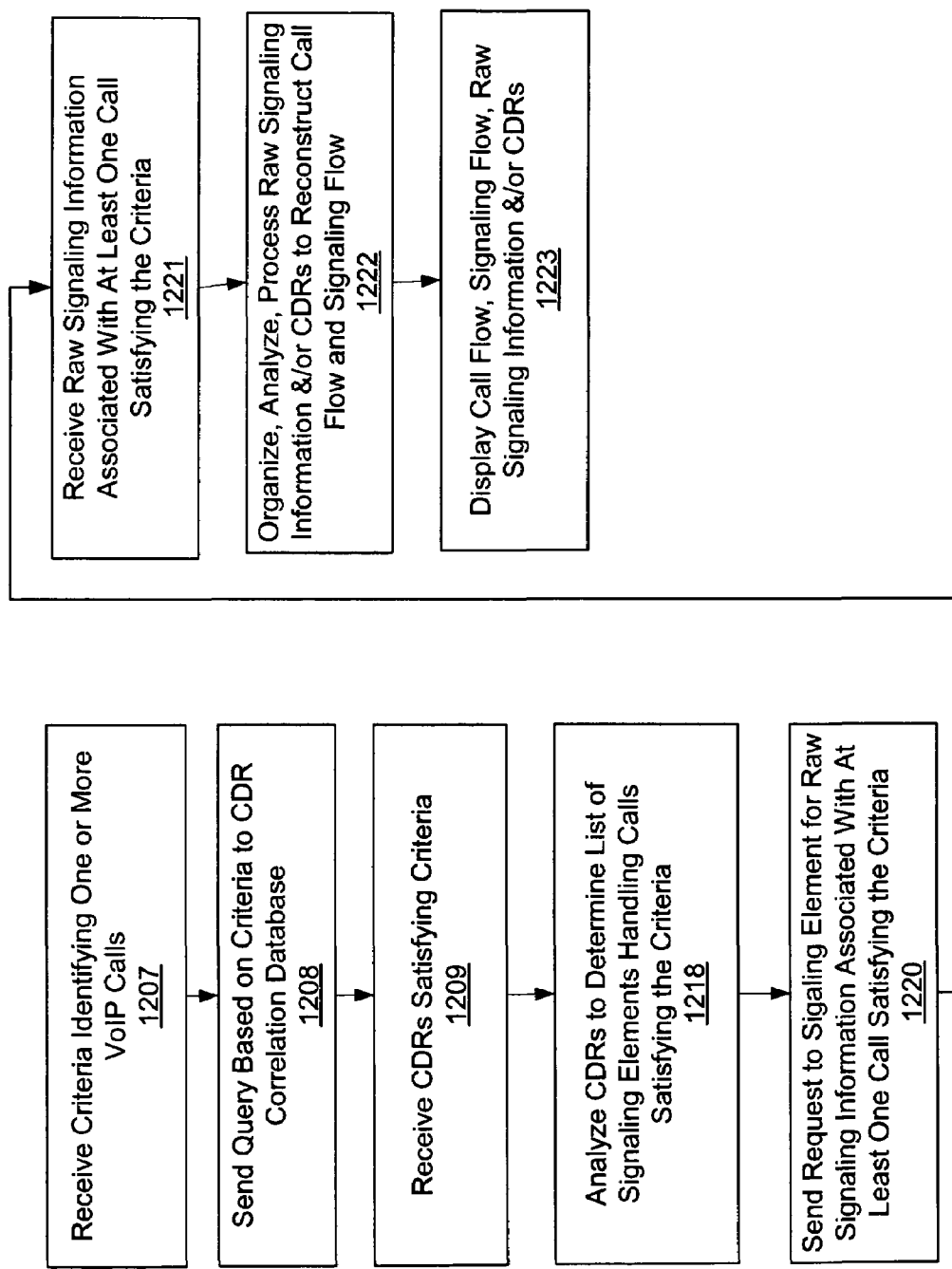
FIG. 4C depicts methods for collection of signaling information from a call in accordance with various embodiments of the present invention.

Turning now to FIG. 4C, a flow diagram 1200 depicts a method for collection of signaling information from a call through a network, from a perspective of a VCC, in accordance with various embodiments of the present invention. The VCC receives criteria identifying one or more VoIP calls (block 1207), and sends a query based on the criteria to a CDR correlation database (block 1208). The VCC receives back from the CDR correlation database CDRs and/or a correlated record of CDRs that satisfy the criteria (block 1209). The VCC analyzes the CDRs to determine a list of all signaling elements handling calls that satisfy the criteria (block 1218). Using the list of all signaling elements handling calls that satisfy the criteria, the VCC sends a request to at least one signaling element for raw signaling information associated with at least one call satisfying the criteria (block 1220). The VCC receives the raw signaling information associated with at least one call satisfying the criteria (block 1221). The VCC organizes, analyzes and/or processes the raw signaling information and/or CDRs to reconstruct a call flow and/or a signaling flow for each call satisfying the criteria (block 1222). The VCC may also display call flows, signaling flows, raw signaling information, and/or CDR information, such as, for example, via a graphical user interface (block 1223).

Figure 5:
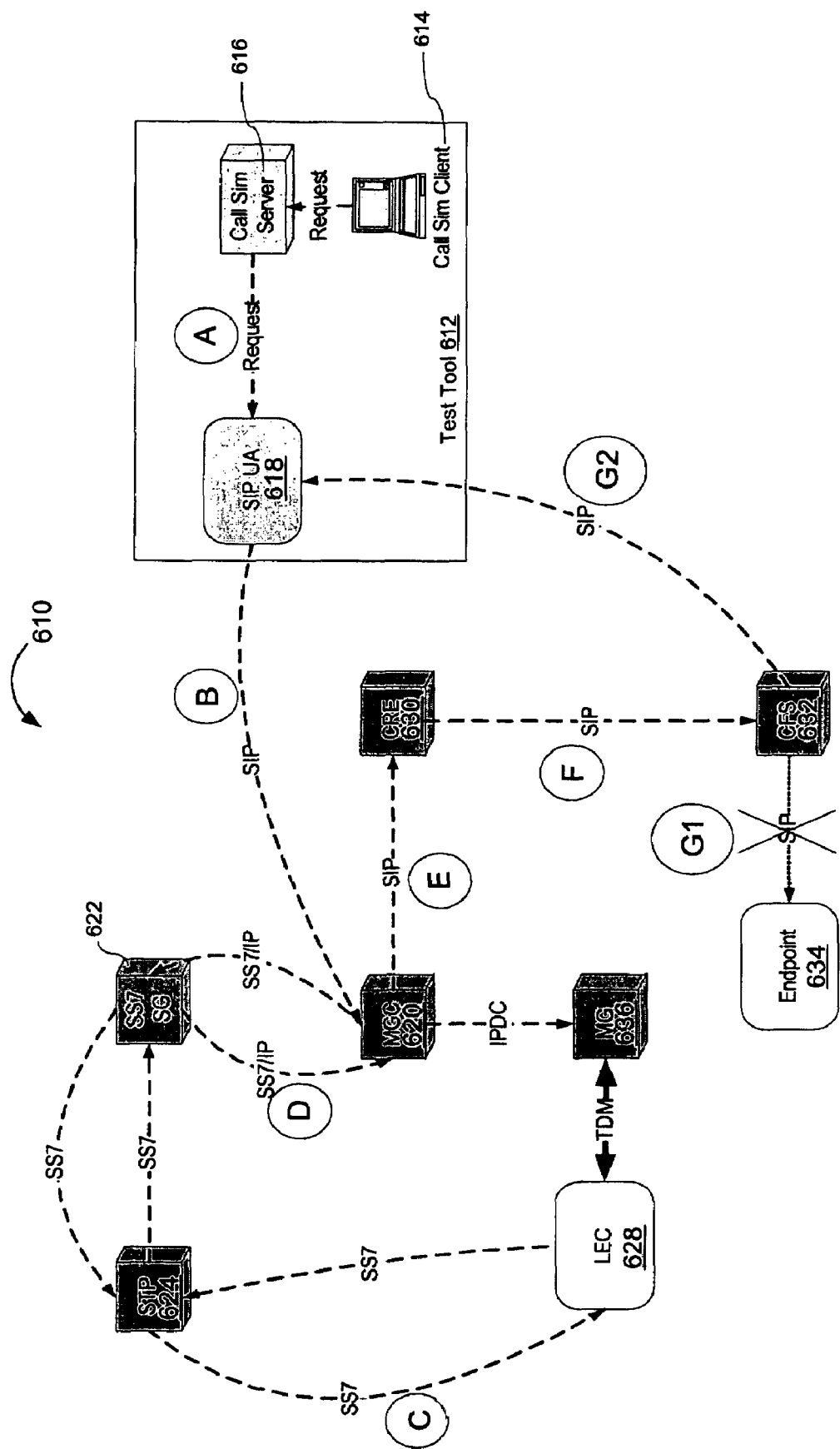
FIG. 5 depicts a signaling diagram for a test call generated by a test tool in accordance with various embodiments of the present invention.

Turning now to FIG. 5, other embodiments of the present invention, apart from those disclosed above, are described. FIG. 1E depicts a signaling diagram 610 for a test call generated by a test tool 612 in accordance with some embodiments of the present invention. Signaling system 610 includes test tool 612, media gateway controller (MGC) 620, signaling system 7 ("SS7") SG 622, signaling transfer point ("STP") 624, local exchange carrier ("LEC") 628, media gateway ("MG") 636, core routing engine ("CRE") 630, customer feature server ("CFS") 632, and endpoint 634. Test tool 612 includes a SIP user agent ("UA") 618, a call simulation server 616, and a call simulation client 614. The aforementioned network elements may be associated with a VoIP network and/or each other.

In a typical scenario, a call through test is initiated by loading one or more phone numbers into call simulation server 616. Phone numbers may be loaded into call simulation server 616, for example, via call simulation client 614. According to some embodiments, call simulation client 614 is a computer workstation operable to execute instructions maintained on a computer-readable medium. Once the phone numbers have been loaded into call simulation server 616, call simulation server 616 sends a request along path A to SIP UA 618 to generate a call with one of the tested outbound phone numbers in the "to" field and a test key in the "from" field. SIP UA 618 creates a SIP invite using the "to" and "from" fields from the request and sends the SIP invite along path B to MGC 620, which services the particular outbound number in the "to" field.

MGC 620 creates an SS7 message based on the SIP invite with the "called party number" field equal to the "to" field in the SIP invite and the "calling party number" field equal to the "from" number in the SIP invite. MGC 620 sends a SS7 initial address message ("IAM") to LEC 628 along path C, via SS7 SG 622 and STP 624. When LEC 628 receives the call, it determines that the dialed number, or "called party number," is associated with the network, such as, for example, the VoIP network, from which the call originated, so LEC 628 sends the call back to MGC 620 along path D, via STP 624 and SS7 SG 622. According to some embodiments of the present invention, when MGC 620 receives the call, it does not access the test key and does not recognize the call as the same call previously sent out to LEC 628. Therefore, MGC 620 processes the call to determine that the call is a voice call. MGC 620 creates a SIP invite based on the SS7 message with the "called party number" field equal to the "to" field of the SIP invite and the "calling party number" field equal to the "from" field of the SIP invite. MGC 620 sends the SIP invite to CRE 630 along path E. CRE 630 determines which CFS 632 is associated with and/or services the "called party number" and sends the SIP invite to CFS 632 along path F. CFS 632 determines where to send the call for termination. Normally, CFS 620 would route the call along path G1 to endpoint 634 assigned to and/or associated with the "called party number;" however, since the "calling party number" is the test key from test tool 612, CFS 620 instead sends the SIP invite to test tool 612 along path G2. According to some embodiments of the present invention, CFS 620 accesses the "calling party number" field of each call received and determines whether the "calling party number" field contains a test key, such as, for example, a test key generated by test tool 612. When test tool 612 receives the SIP invite, test tool 612 accesses the test key in the "calling party number" field and determines that the call is a test call. Alternatively, test tool 612 may access the test key in one or more other fields to determine that the call is a test call. For example, the test key may be created in or as one or more of the following: the "calling party number" field, the "called party number" field, the SIP "call ID" field, and the remote SIP "call ID" field. Based on the determination, test tool 612 releases the call, instead of answering the call, having verified that the call was routed through LEC 628 and the VoIP network back to test tool 612.

Embodiments of the invention have now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for verifying the routing of a call through a voice over internet protocol (VoIP) network, the method comprising:
    generating an outbound call from a test tool in a first network, wherein the first network is a VoIP network, and wherein the outbound call includes a test key and a destination number, and wherein the destination number is associated with a communication device accessible to the first network;
    routing the outbound call to a second network;
    receiving the outbound call from the second network in the form of an inbound call to the first network, wherein the inbound call includes the test key and the destination number;
    accessing the test key; and
    based at least in part on the test key, routing the inbound call to the test tool.

2. The method of claim 1, wherein the second network is a public switched telephone network.

3. The method of claim 1, wherein the test tool is a computer terminal communicably coupled to the first network.

4. The method of claim 1, wherein the test tool is a computer terminal communicably coupled to the second network, and wherein the second network is a public switched telephone network.

5. A system for verifying voice over Internet protocol network provisioning, the system comprising:
    a computer, wherein the computer is communicably coupled to a computer readable medium and a voice over Internet protocol (VoIP) network, and wherein the computer readable medium includes instructions executable by a microprocessor to:
    generate an outbound call, wherein the outbound call includes a test key and a destination number, and wherein the destination number is associated with a communication device accessible to the VoIP network;
    provide the outbound call to a routing resource associated with the VoIP network, wherein the routing resource is operable to direct the outbound call to a another network and to receive the outbound call back from the another network, and wherein the routing resource is further operable to access the test key;
    receive the outbound call routed to the computer from the routing resource based at least in part on the test key; and
    make a record indicating whether the outbound call was properly routed based on receiving the outbound call from the routing resource.

6. The method of claim 1, wherein the network resource is selected from a group consisting of: a session border controller, a gateway, a gateway controller, a softswitch, a proxy server, and a feature server.

7. The method of claim 2, wherein the network resource is a softswitch, and wherein the softswitch is configured to route all outbound calls to the public switched telephone network.

8. The method of claim 2, wherein the network resource is a softswitch, and wherein the softswitch is configured to route only outbound calls containing the test key to the public switched telephone network.

9. The method of claim 1, further comprising: making a record that indicates whether the destination number has been properly re-routed back to the test tool.

10. The method of claim 1, wherein the method further comprises:
    collecting tracking information for the inbound call and the outbound call.

11. The method of claim 10, wherein the tracking information is selected from a group consisting of signaling system 7 tracking information, internet protocol device control tracking information, and session initiation protocol tracking information.

12. The method of claim 11, wherein the session initiation protocol tracking information includes signaling latency information.

13. The method of claim 12, wherein the method further comprises:
    calculating post-dialing delay.

14. The method of claim 10, wherein the method further comprises:
    providing a graphical output device;
    creating a sequence diagram showing the tracking information; and
    displaying the sequence diagram on the graphical output device.

15. The method of claim 14, wherein the graphical output device is communicably coupled to a voice call coordinator.

16. The method of claim 1, wherein the test tool is a computer terminal communicably coupled to the first network, and wherein the first network is a Voice over Internet Protocol network.

17. The method of claim 1, wherein the test tool is a computer terminal communicably coupled to the second network, wherein the first network is a Voice over Internet Protocol network, and wherein the second network is a public switched telephone network.

18. A method to verify whether a call has been properly routed in a voice over internet protocol network, the method comprising:
 generating an outbound call from a test tool in a voice over internet protocol network, wherein the outbound call includes a destination number;
 routing the outbound call to a public switched telephone network;
 determining whether the outbound call has been placed to the destination number without being routed back into the voice over internet protocol network; and
 ending the outbound call by the test tool based on a determination that the outbound call has been placed to the destination number without being routed back into the voice over internet protocol network; and
 based on the determination that the outbound call has been placed to the destination number without being routed back into the voice over internet protocol network, indicating that the outbound call was not correctly routed.

19. The method of claim 18, further comprising: making a record that indicates that the destination party phone number has not been properly provisioned.

20. The method of claim 18, wherein determining whether the outbound call has been placed to the destination party phone number without coming back into the VoIP network comprises:
 determining whether the outbound call rings at the destination party phone number.

21. The method of claim 18, further comprising:
 collecting call tracking information for the outbound call from at least one device that handled the outbound call; and
 displaying the call tracking information for the outbound call.

22. A system for verifying the routing of a voice-over-internet-protocol call through a voice over internet protocol network, the system comprising:
 a test tool within a voice over internet protocol network configured to generate an outbound call with a predetermined originating number and a destination number, and wherein the destination number is associated with a communication device accessible to the voice over internet protocol network;
 a first network routing resource configured to receive the outbound call, send the outbound call to a public switched telephone network, receive the outbound call back from the public switched telephone network in the form of an inbound call, and route the inbound call through the voice over internet protocol network;
 a second network routing resource configured to receive the inbound call, recognize that the inbound call is a test call based on the predetermined originating number, and route the test call back to the test tool.

23. The system of claim 22, wherein the first network routing resource and the second network routing resource are each selected from a group consisting of: a session border controller, a softswitch, a gateway, a gateway controller, a proxy server, and a feature server.

24. The system of claim 22, further comprising a voice call coordinator configured to collect tracking information for the test call, wherein the tracking information is selected from a group consisting of: signaling system 7 tracking information, internet protocol device control tracking information, and session initiation protocol tracking information.

25. The system of claim 22, wherein the voice call coordinator is further configured to calculate post-dialing delay.

26. A system for verifying network provisioning, the system comprising:
 a computer, wherein the computer is communicably coupled to a computer readable medium and a first network, and wherein the computer readable medium includes instructions executable by a microprocessor to:
 generate an outbound call, wherein the outbound call includes a test key and a destination number, and wherein the destination number is associated with a communication device accessible to the first network;
 provide the outbound call to a routing resource associated with the first network, wherein the routing resource is operable to direct the outbound call to a second network and to receive the outbound call back from the second network, and wherein the routing resource is further operable to access the test key;
 receive the outbound call routed to the computer from the routing resource based at least in part on the test key; and
 make a record indicating whether the outbound call was properly routed based on receiving the outbound call from the routing resource.

27. A system for verifying provisioned access numbers in a voice over internet protocol network, the system comprising:
 a softswitch associated with a first network, wherein the softswitch is communicably coupled to a test tool, and wherein the softswitch is operable to:
 receive a test call from the test tool, wherein the test call includes a test key and a destination number, and wherein the destination number is associated with a communication device accessible to a first network;
 direct the test call to a second network;
 receive the test call back from the second network;
 access the test key; and
 based at least in part on the test key, route the test call to the test tool.

28. The method of claim 27, wherein the first network is a voice over internet protocol network, and wherein the second network is a public switched telephone network.

29. The method of claim 18, wherein the outbound call includes a test key accessible by one or more network routing resources, each network routing resource configured to determine whether to route the outbound call to another network routing resource or the test tool based on the destination number and the test key.

30. The method of claim 29, wherein each network routing resource is further configured to determine if the network routing resource is a last device to handle the outbound call based on the destination number and the test key.

* * * * *

UNITED STATES PATENT AND TRADEMARK OFFICE
CERTIFICATE OF CORRECTION

| | | |
|---|---|---|
| PATENT NO. | : 7,436,936 B2 | Page 1 of 3 |
| APPLICATION NO. | : 11/064415 | |
| DATED | : October 14, 2008 | |
| INVENTOR(S) | : Terpstra et al. | |

It is certified that error appears in the above-identified patent and that said Letters Patent is hereby corrected as shown below:

In Box <u>1220</u> of drawing sheet 14/15 (FIG. 4C) of the patent, delete "Sigaling Element" and insert --Signaling Element--, therefor.

In column 22, lines 3-4 of the patent, in claim 3, delete "The method of claim 1, wherein the test tool is a computer terminal communicably coupled to the first network." and insert --The method of claim 1, wherein the test key is included with the outbound call in the place of an origination number.--, therefor.

In column 22, lines 5-8 of the patent, in claim 4, delete "The method of claim 1, wherein the test tool is a computer terminal communicably coupled to the second network, and wherein the second network is a public switched telephone network." and insert --The method of claim 1, wherein the method further comprises receiving the inbound call at a network resource within the first network, and wherein the network resource within the first network is operable to access the test key and to route the inbound call to the test tool.--, therefor.

In column 22, lines 9-30 of the patent, in claim 5, delete "A system for verifying voice over Internet protocol network provisioning, the system comprising: a computer, wherein the computer is communicably coupled to a computer readable medium and a voice over Internet protocol (VoIP) network, and wherein the computer readable medium includes instructions executable by a microprocessor to: generate an outbound call, wherein the outbound call includes a test key and a destination number, and wherein the destination number is associated with a communication device accessible to the VoIP network; provide the outbound call to a routing resource associated with the VoIP network, wherein the routing resource is operable to direct the outbound call to a another network and to receive the outbound call back from the another network, and wherein the routing resource is further operable to access the test key; receive the outbound call routed to the computer from the routing resource based at least in part on the test key; and make a record indicating whether the outbound call was properly routed based on receiving the outbound call from the routing resource." and insert --The method of claim 1, wherein the method further comprises:
receiving the inbound call at a first network resource within the first network;
routing the inbound call to a second network resource within the first network;
accessing the test key with the second network resource; and
routing the inbound call to the test tool based on the test key.--, therefor.

UNITED STATES PATENT AND TRADEMARK OFFICE
CERTIFICATE OF CORRECTION

| | | |
|---|---|---|
| PATENT NO. | : 7,436,936 B2 | |
| APPLICATION NO. | : 11/064415 | |
| DATED | : October 14, 2008 | |
| INVENTOR(S) | : Terpstra et al. | |

It is certified that error appears in the above-identified patent and that said Letters Patent is hereby corrected as shown below:

In column 22, line 51 of the patent, delete "of" and insert --of:--, therefor.

In column 23, lines 5-6 of the patent, delete ", and wherein the first network is a Voice over Internet Protocol network".

In column 23, lines 7-11 of the patent, delete "wherein the first network is a Voice over Internet Protocol network,".

In column 23, line 22 of the patent, delete "network; and" and insert --network;--, therefor.

In column 23, line 32 of the patent, delete "destination party phone number" and insert --destination phone number--, therefor.

In column 23, lines 35-36 of the patent, delete "destination party phone number" and insert --destination phone number--, therefor.

In column 23, line 36 of the patent, delete "coming back" and insert --being routed back--, therefor.

In column 23, lines 38-39 of the patent, delete "destination party phone number" and insert --destination phone number--, therefor.

In column 24, line 14 of the patent, delete "verifying network provisioning" and insert --verifying voice over Internet protocol network provisioning--, therefor.

In column 24, lines 17-18 of the patent, delete "first network" and insert --voice over Internet protocol network--, therefor.

In column 24, line 23 of the patent, delete "first network" and insert --VoIP network--, therefor.

UNITED STATES PATENT AND TRADEMARK OFFICE
CERTIFICATE OF CORRECTION

PATENT NO. : 7,436,936 B2
APPLICATION NO. : 11/064415
DATED : October 14, 2008
INVENTOR(S) : Terpstra et al.

It is certified that error appears in the above-identified patent and that said Letters Patent is hereby corrected as shown below:

In column 24, line 25 of the patent, delete "first network" and insert --VoIP network--, therefor.

In column 24, line 26 of the patent, delete "a second network" and insert --another network--, therefor.

In column 24, lines 27-28 of the patent, delete "the second network" and insert --the another network--, therefor.

.

Signed and Sealed this

Sixteenth Day of June, 2009

JOHN DOLL
*Acting Director of the United States Patent and Trademark Office*